US012319165B2

(12) United States Patent
Austrheim et al.

(10) Patent No.: US 12,319,165 B2
(45) Date of Patent: Jun. 3, 2025

(54) AUTOMATED STORAGE AND RETRIEVAL SYSTEM

(71) Applicant: Autostore Technology AS, Nedre Vats (NO)

(72) Inventors: Trond Austrheim, Etne (NO); Ivar Fjeldheim, Haugesund (NO); Ingvar Fagerland, Kolnes (NO)

(73) Assignee: AutoStore Technology AS, Nedre Vats (NO)

( * ) Notice: Subject to any disclaimer, the term of this patent is extended or adjusted under 35 U.S.C. 154(b) by 0 days.

(21) Appl. No.: 18/666,455

(22) Filed: May 16, 2024

(65) Prior Publication Data
US 2024/0300356 A1 Sep. 12, 2024

Related U.S. Application Data

(63) Continuation of application No. 16/981,465, filed as application No. PCT/EP2019/053875 on Feb. 15, 2019, now Pat. No. 12,059,966.

(30) Foreign Application Priority Data

Apr. 25, 2018 (NO) .................................. 20180586

(51) Int. Cl.
*B60L 53/36* (2019.01)
*B60L 53/30* (2019.01)
(Continued)

(52) U.S. Cl.
CPC ............... *B60L 53/36* (2019.02); *B60L 53/30* (2019.02); *B60L 53/80* (2019.02); *B60S 5/06* (2013.01);
(Continued)

(58) Field of Classification Search
CPC .......... B60L 53/36; B60L 53/30; B60L 53/80; B60L 2200/44; B60L 2260/32;
(Continued)

(56) References Cited

U.S. PATENT DOCUMENTS 4,088,232 A 5/1978 Lilly
5,538,809 A 7/1996 Bittihn et al.
(Continued)

FOREIGN PATENT DOCUMENTS

CN 105899398 A 8/2016
CN 105899398 A1 8/2016
(Continued)

OTHER PUBLICATIONS

International Search Report issued in Application No. PCT/EP2019/053875, mailed on Aug. 14, 2019 (8 pages).
(Continued)

*Primary Examiner* — Thomas Randazzo
(74) *Attorney, Agent, or Firm* — Baker Botts L.L.P.

(57) ABSTRACT

The present invention relates to an automated storage and retrieval system having: a track system forming a grid pattern comprising a plurality of adjacent grid cells, each comprising an opening below which is a storage column for storing a stack of storage containers; a container handling vehicle for lifting storage containers, the vehicle comprising a lower part having at least one container storage compartment, an upper part above the lower part, rolling means for movement along the track system, and a compartment in the upper part for accommodating/receiving a replaceable power supply; the replaceable power supply which has a charging connection; and a charging station comprising a charging connection for connection with the power supply and a support for releasably supporting the power supply during charging; wherein the vehicle comprises a second (Continued)

battery to allow movement of the vehicle when void of the replaceable power supply.

18 Claims, 21 Drawing Sheets

(51) Int. Cl.
*B60L 53/80* (2019.01)
*B60S 5/06* (2019.01)
*B65G 1/04* (2006.01)
*B65G 1/06* (2006.01)
*B65G 1/137* (2006.01)

(52) U.S. Cl.
CPC ......... *B65G 1/0464* (2013.01); *B65G 1/0478* (2013.01); *B65G 1/065* (2013.01); *B65G 1/1378* (2013.01); *B65G 2201/0258* (2013.01); *Y02T 10/70* (2013.01); *Y02T 10/7072* (2013.01); *Y02T 90/12* (2013.01); *Y02T 90/14* (2013.01)

(58) Field of Classification Search
CPC ......... B60L 53/16; B60S 5/06; B65G 1/0464; B65G 1/0478; B65G 1/065; B65G 1/1378; B65G 2201/0258; B65G 1/0492; B65G 1/137; Y02T 10/70; Y02T 10/7072; Y02T 90/12; Y02T 90/14; B60Y 2200/62; Y02P 90/60
See application file for complete search history.

(56) References Cited

U.S. PATENT DOCUMENTS

| | | | |
|---|---|---|---|
| 9,573,532 | B2 | 2/2017 | Riddiford et al. |
| 11,360,465 | B2* | 6/2022 | Austrheim ........... B65G 1/0478 |
| 12,059,966 | B2* | 8/2024 | Austrheim ............ B60L 53/16 |
| 2014/0217977 | A1 | 8/2014 | Pastoor et al. |
| 2015/0307276 | A1* | 10/2015 | Hognaland ............ B65G 1/137 |
| 2016/0194151 | A1 | 7/2016 | Lindbo et al. |
| 2016/0325932 | A1* | 11/2016 | Hognaland ....... H02J 13/00002 |
| 2017/0129706 | A1* | 5/2017 | Hognaland .............. B65G 1/06 |
| 2018/0194571 | A1* | 7/2018 | Fryer .................... B65G 1/065 |
| 2018/0370725 | A1* | 12/2018 | Hognaland .......... B65G 1/0457 |
| 2019/0019707 | A1* | 1/2019 | Suzuki .................... B25J 9/104 |
| 2020/0223633 | A1* | 7/2020 | Stadie .................... B65G 15/28 |

FOREIGN PATENT DOCUMENTS

| | | | | |
|---|---|---|---|---|
| CN | 106241154 | A | 12/2016 | |
| CN | 106660703 | A | 5/2017 | |
| CN | 107878248 | A | 4/2018 | |
| EP | 0698530 | A1 | 2/1996 | |
| EP | 1 810 548 | A2 | 7/2007 | |
| EP | 3250481 | A1 | 12/2017 | |
| JP | H5-207611 | A | 8/1993 | |
| JP | 2003/118671 | A | 4/2003 | |
| JP | 2015-535517 | A | 12/2015 | |
| JP | 2016-529181 | A | 9/2016 | |
| JP | 2016-183050 | A | 10/2016 | |
| JP | 2016540487 | A | 12/2016 | |
| JP | 2017-503731 | A | 2/2017 | |
| JP | 2017-524625 | A | 8/2017 | |
| JP | 2018-504337 | A | 2/2018 | |
| JP | 2019-527527 | A | 9/2019 | |
| JP | 2020519550 | A | 7/2020 | |
| NO | 317366 | B1 | 10/2004 | |
| NO | 340341 | B1 | 4/2017 | |
| WO | 2006/126881 | A2 | 11/2006 | |
| WO | 2014/075937 | A1 | 5/2014 | |
| WO | 2014/090684 | A1 | 6/2014 | |
| WO | 2015/019055 | A1 | 2/2015 | |
| WO | WO-2015104263 | A2 * | 7/2015 | .......... B60L 11/1809 |
| WO | 2015/104263 | A3 | 10/2015 | |
| WO | 2015/193278 | A1 | 12/2015 | |
| WO | 2016/120075 | A1 | 8/2016 | |
| WO | 2017037095 | A1 | 3/2017 | |
| WO | 2017081281 | A1 | 5/2017 | |
| WO | WO-2017220627 | A1 * | 12/2017 | .............. B60L 53/30 |
| WO | 2018/210851 | A1 | 11/2018 | |
| WO | 2018/210923 | A1 | 11/2018 | |

OTHER PUBLICATIONS

Written Opinion issued in International Application No. PCT/EP2019/053875, mailed on Aug. 14, 2019 (18 pages).
Search Report issued Norwegian Application No. 20180586, mailed Nov. 16, 2018 (2 pages).
Search report issued in Chinese Application No. 2019800280817, mailed on Aug. 4, 2021 (11 pages).
Extended European Search Report issued in counterpart European Application No. 22 201 412.8 mailed on May 4, 2023 (14 pages).
English Translation of Search Report issued in counterpart Japanese Patent Application No. 2020-558876 mailed on Jan. 24, 2023 (31 pages).
Miki Kato, Notice of Allowance for Japanese Patent Application No. 2023136868, dated Sep. 27, 2024, 6 pages, pub. by the JPO.
Chevret, Anthony, Extended European Search Report for European patent application No. EP24183533.9, dated Sep. 11, 2024, 7 pages, published by the European Patent Office, Munich, Germany.
Chevret, Anthony, Office Action for European patent application No. EP24183533.9, dated Jan. 13, 2025, 4 pages, published by the European Patent Office, Rijswijk, Netherlands.
Anonymous, CN 105899398 A, Machine translation of Abstract, pub. by SIPO in Chinese original, Beijing, China, Aug. 14, 2016, 1 page.
Z. Youzhi, Search Report in application 2022112334258, State Intellectual Property Office of the People's Republic of China, pub. by SIPO, Beijing, China, Jan. 15, 2025, 3 pages. (Machine English translation).
Z. Youzhi, Search Report in application 2022112334258, State Intellectual Property Office of the People's Republic of China, pub. by SIPO, Beijing, China, Jan. 15, 2025, 3 pages. (Chinese original).
Z. Youzhi, First Office Opinion Notice in application 2022112334258, State Intellectual Property Office of the People's Republic of China, pub. by SIPO, Beijing, China, Jan. 17, 2025, 8 pages. (Machine English translation).
Z. Youzhi, First Office Opinion Notice in application 2022112334258, State Intellectual Property Office of the People's Republic of China, pub. by SIPO, Beijing, China, Jan. 17, 2025, 8 pages. (Chinese original).

* cited by examiner

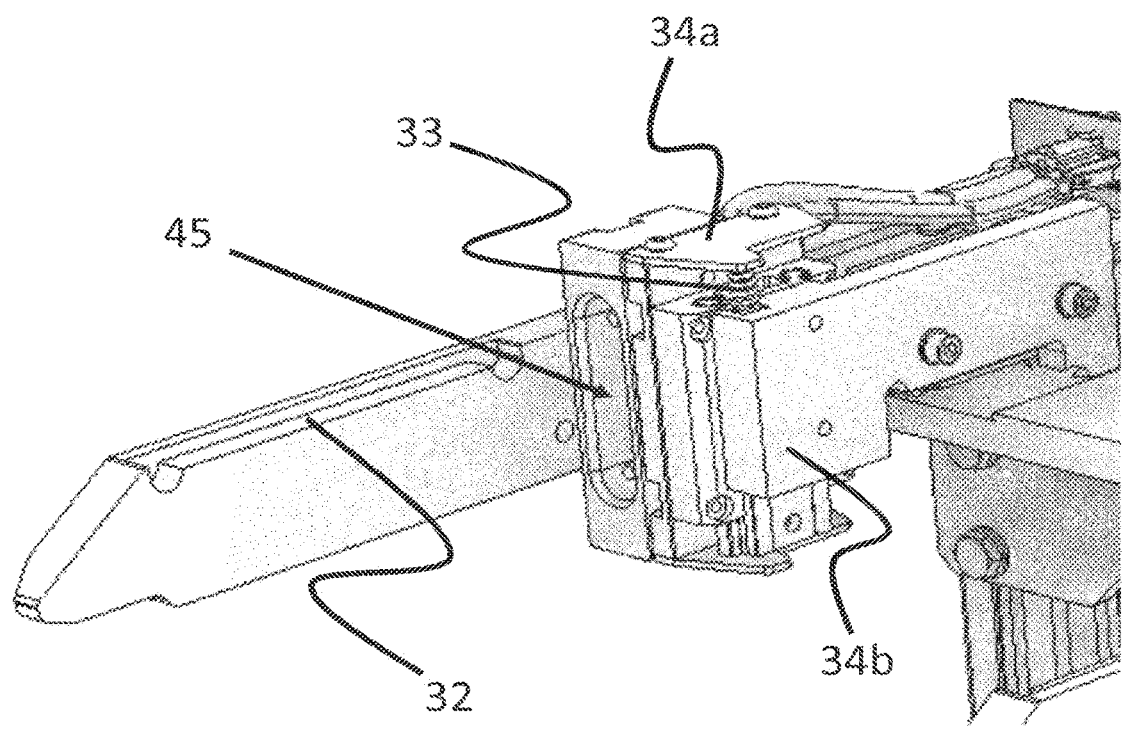
FIG. 22 (Detail A)

AUTOMATED STORAGE AND RETRIEVAL SYSTEM

CROSS-REFERENCE TO RELATED APPLICATIONS

This application claims the benefit under 35 U.S.C. § 120 as a continuation of application Ser. No. 16/981,465, filed Sep. 16, 2020, which claims the benefit as a § 371 national stage entry of PCT international application PCT/EP2019/053875, filed Feb. 15, 2019, which claims the benefit of Norway application No. 20180586, filed Apr. 25, 2018, the entire contents of which are hereby incorporated by reference as if fully set forth herein. The Applicant hereby rescinds any disclaimer of claim scope in the application(s) of which the benefit is claimed and advises the USPTO that the present claims may be broader than any application(s) of which the benefit is claimed.

TECHNICAL FIELD

The present invention relates to an automated storage and retrieval system for storage and retrieval of containers using a charging station and a method thereof.

BACKGROUND

FIG. 1 discloses a typical prior art automated storage and retrieval system 1 with a framework structure 100 and FIGS. 2 and 3 discloses two different prior art container handling vehicles 201,301 suitable for operating on such a system 1.

The framework structure 100 comprises a number of upright members 102 and a number of horizontal members 103 which are supported by the upright members 102. The members 102, 103 may typically be made of metal, e.g. extruded aluminum profiles.

The framework structure 100 defines a storage grid 104 comprising storage columns 105 arranged in rows, in which storage columns 105 storage containers 106, also known as bins, are stacked one on top of another to form stacks 107. The storage grid 104 guards against horizontal movement of the stacks 107 of storage containers 106, and guides vertical movement of the containers 106, but does normally not otherwise support the storage containers 106 when stacked.

The automated storage and retrieval system 1 comprises a rail system 108 arranged in a grid pattern across the top of the storage 104, on which rail system 108 a plurality of container handling vehicles 201,301 are operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201,301 in a first direction X across the top of the frame structure 100, and a second set of parallel rails 111 arranged perpendicular to the first set of rails 110 to guide movement of the container handling vehicles 201,301 in a second direction Y which is perpendicular to the first direction X. In this way, the rail system 108 defines grid columns 112 above which the container handling vehicles 201,301 can move laterally above the storage columns 105, i.e. in a plane which is parallel to the horizontal X-Y plane.

Each prior art container handling vehicle 201,301 comprises a vehicle body 201a,301a, and first and second sets of wheels 201b,301b,201c,301c which enable the lateral movement of the container handling vehicles 201,301 in the X direction and in the Y direction, respectively. In FIGS. 2 and 3 two wheels in each set are fully visible. The first set of wheels 201b,301b is arranged to engage with two adjacent rails of the first set 110 of rails, and the second set of wheels 201c,301c is arranged to engage with two adjacent rails of the second set 111 of rails. Each set of wheels 201b,301b 201c,301c can be lifted and lowered, so that the first set of wheels 201b,301b and/or the second set of wheels 201c, 301c can be engaged with the respective set of rails 110, 111 at any one time.

Each prior art container handling vehicle 201,301 also comprises a lifting device (not shown) for vertical transportation of storage containers 106, e.g. raising a storage container 106 from, and lowering a storage container 106 into, a storage column 105. The lifting device comprises one or more gripping/engaging devices (not shown) which are adapted to engage a storage container 106, and which gripping/engaging devices can be lowered from the vehicle 201,301 so that the position of the gripping/engaging devices with respect to the vehicle 201,301 can be adjusted in a third direction Z which is orthogonal the first direction X and the second direction Y.

Conventionally, and also for the purpose of this application, Z=1 identifies the uppermost layer of the grid 104, i.e. the layer immediately below the rail system 108, Z=2 the second layer below the rail system 108, Z=3 the third layer etc. In the exemplary prior art grid disclosed in FIG. 1, Z=8 identifies the lowermost, bottom layer of the grid 104. Similarly, X=1 . . . n and Y=1 . . . n identifies the position of each grid column 112 in the horizontal plane. Consequently, as an example, and using the Cartesian coordinate system X, Y, Z indicated in FIG. 1, the storage container identified as 106' in FIG. 1 can be said to occupy grid location or cell X=10, Y=2, Z=3. The container handling vehicles 201,301 can be said to travel in layer Z=0, and each grid column 112 can be identified by its X and Y coordinates.

Each prior art container handling vehicle 201,301 comprises a storage compartment or space for receiving and stowing a storage container 106 when transporting the storage container 106 across the rail system 108. The storage space may comprise a cavity arranged centrally within the vehicle body 201a as shown in FIG. 2 and as described in e.g. WO2015/193278A1, the contents of which are incorporated herein by reference.

FIG. 3 shows an alternative configuration of a container handling vehicles 301 with a cantilever construction. Such a vehicle is described in detail in e.g. NO317366, the contents of which are also incorporated herein by reference.

The central cavity container handling vehicles 201 shown in FIG. 2 may have a footprint that covers an area with dimensions in the X and Y directions which is generally equal to the lateral extent of a grid column 112, i.e. the extent of a grid column 112 in the X and Y directions, e.g. as is described in WO2015/193278A1, the contents of which are incorporated herein by reference. The term 'lateral' used herein may mean 'horizontal'.

Alternatively, the central cavity container handling vehicles 101 may have a footprint which is larger than the lateral area defined by a grid column 112, e.g. as is disclosed in WO2014/090684A1.

The rail system 108 may be a single rail system, as is shown in FIG. 4. Alternatively, the rail system 108 may be a double rail system, as is shown in FIG. 5, thus allowing a container handling vehicle 201 having a footprint generally corresponding to the lateral area defined by a grid column 112 to travel along a row of grid columns even if another container handling vehicle 201 is positioned above a grid column neighboring that row. Both the single and double rail system, or a combination comprising a single and double rail arrangement in a single rail system 108, forms a grid pattern in the horizontal plane P comprising a plurality of rectangular and uniform grid locations or grid cells 122, where each grid cell 122 comprises a grid opening 115 being delimited by a pair of tracks 110a, 110b of the first tracks 110 and a pair of tracks 111a, 111b of the second set of tracks 111. In FIG. 5 the grid cell 122 is indicated by a dashed box.

Consequently, tracks 110a and 110b form pairs of tracks defining parallel rows of grid cells running in the X direction, and tracks 111a and 111b form pairs of tracks defining parallel rows of grid cells running in the Y direction.

As shown in FIG. 6, each grid cell 122 has a width Wc which is typically within the interval of 30 to 150 cm, and a length Lc which is typically within the interval of 50 to 200 cm. Each grid opening 115 has a width Wo and a length Lo which is typically 2 to 10 cm less than the width Wc and the length Lc of the grid cell 122.

In the X and Y directions, neighbouring grid cells are arranged in contact with each other such that there is no space there-between.

In a storage grid 104, a majority of the grid columns 112 are storage columns 105, i.e. grid columns 105 where storage containers 106 are stored in stacks 107. However, a grid 104 normally has at least one grid column 112 which is used not for storing storage containers 106, but which comprises a location where the container handling vehicles 201,301 can drop off and/or pick up storage containers 106 so that they can be transported to an access station (not shown) where the storage containers 106 can be accessed from outside of the grid 104 or transferred out of or into the grid 104. Within the art, such a location is normally referred to as a 'port' and the grid column 112 in which the port is located may be referred to as a 'port column' 119,120. The transportation to the access station may be in any direction, that is horizontal, tilted and/or vertical. For example, the storage containers 106 may be placed in a random or dedicated grid column 112 within the storage grid 104, then picked up by any container handling vehicle and transported to a port 119,120 for further transportation to an access station. Note that the term 'tilted' means transportation of storage containers 106 having a general transportation orientation somewhere between horizontal and vertical.

The grid 104 in FIG. 1 comprises two port columns 119 and 120. The first port column 119 may for example be a dedicated drop-off port column where the container handling vehicles 201,301 can drop off storage containers 106 to be transported to an access or a transfer station, and the second port column 120 may be a dedicated pick-up port column where the container handling vehicles 201,301 can pick up storage containers 106 that have been transported to the grid 104 from an access or a transfer station.

The access station may typically be a picking or a stocking station where product items are removed from or positioned into the storage containers 106. In a picking or a stocking station, the storage containers 106 are normally never removed from the automated storage and retrieval system 1, but are returned into the grid 104 once accessed. A port can also be used for transferring storage containers out of or into the grid 104, e.g. for transferring storage containers 106 to another storage facility (e.g. to another grid or to another automated storage and retrieval system), to a transport vehicle (e.g. a train or a lorry), or to a production facility.

A conveyor system comprising conveyors is normally employed to transport the storage containers between the ports 119,120 and the access station.

If the ports 119,120 and the access station are located at different levels, the conveyor system may comprise a lift device with a vertical component for transporting the storage containers 106 vertically between the port 119,120 and the access station.

The conveyor system may be arranged to transfer storage containers 106 between different grids, e.g. as is described in WO2014/075937A1, the contents of which are incorporated herein by reference.

When a storage container 106 stored in the grid 104 disclosed in FIG. 1 is to be accessed, one of the container handling vehicles 201,301 is instructed to retrieve the target storage container 106 from its position in the grid 104 and transport it to the drop-off port 119. This operation involves moving the container handling vehicle 201,301 to a grid location above the storage column 105 in which the target storage container 106 is positioned, retrieving the storage container 106 from the storage column 105 using the container handling vehicle's 201,301 lifting device (not shown), and transporting the storage container 106 to the drop-off port 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port 119, or with one or a plurality of other cooperating container handling vehicles. Alternatively, or in addition, the automated storage and retrieval system 1 may have container handling vehicles specifically dedicated to the task of temporarily removing storage containers from a storage column 105. Once the target storage container 106 has been removed from the storage column 105, the temporarily removed storage containers can be repositioned into the original storage column 105. However, the removed storage containers may alternatively be relocated to other storage columns.

When a storage container 106 is to be stored in the grid 104, one of the container handling vehicles 201,301 is instructed to pick up the storage container 106 from the pick-up port 120 and transport it to a grid location above the storage column 105 where it is to be stored. After any storage containers positioned at or above the target position within the storage column stack 107 have been removed, the container handling vehicle 201,301 positions the storage container 106 at the desired position. The removed storage containers may then be lowered back into the storage column 105 or relocated to other storage columns.

For monitoring and controlling the automated storage and retrieval system 1, e.g. monitoring and controlling the location of respective storage containers 106 within the grid 104, the content of each storage container 106; and the movement of the container handling vehicles 201,301 so that a desired storage container 106 can be delivered to the desired location at the desired time without the container handling vehicles 201,301 colliding with each other, the automated storage and retrieval system 1 comprises a control system which typically is computerized and which typically comprises a database for keeping track of the storage containers 106.

However, with the above described storage system there is an undesired robot standstill due to the need of recharge, thereby reducing the operational cycle of the storage system as a whole to typically 16 hours per day.

In WO2015/104263A2, the contents of which are incorporated herein by reference, a storage system is described solving the undesired standstill by arranging a number of charging stations at the perimeter of the storage grid. Each charging station has the capability of charging a power storage source on each vehicle. However, the solution disclosed in WO 2015/104263A2 have disadvantages in that the power supply arrangement reduces both the available space for the storage containers and the overall stability of the vehicles. Further, the hook system used to connect the power storage source to the charging station is quite complex and thus more service intensive and prone to failure. In addition, the prior art hook system limits the potential lateral extent of a connected power storage source due to limited support of the power storage source in the lateral direction.

The inventive solutions described herein may be considered as representing a further development of the storage system as disclosed in WO2015/104263A2, where the above-mentioned disadvantages concerning space and stability are mitigated.

SUMMARY

The present invention is set forth and characterized in the independent claims, while the dependent claims describe other characteristics of the invention.

In a first aspect, the present invention provides an automated storage and retrieval system comprising:
- a track system comprising a first set of parallel tracks arranged in a horizontal plane and extending in a first direction, and a second set of parallel tracks arranged in the horizontal plane and extending in a second direction which is orthogonal to the first direction, said first and second sets of tracks forming a grid pattern in the horizontal plane comprising a plurality of adjacent grid cells, each grid cell comprising a grid opening defined by a pair of adjacent tracks of the first set of tracks and a pair of adjacent tracks of the second set of tracks;
- a plurality of storage columns located beneath the track system, wherein each storage column is located vertically below a grid opening and arranged to store a stack of storage containers;
- a container handling vehicle for lifting at least one storage container stacked in the stacks, the container handling vehicle being configured to move laterally on the track system above the storage columns to access the storage containers via the grid openings, wherein
  the container handling vehicle comprises a lower part comprising at least one storage compartment for storing a storage container, an upper part arranged vertically above the lower part, a wheel assembly for guiding the container handling vehicle along the track system and a power supply compartment for accommodating a replaceable power supply;
- a replaceable power supply for accommodation in the power supply compartment, having a power supply charging connection; and
- a charging station for charging of the replaceable power supply, the charging station comprising a charging connection configured to create an electrical connection with the power supply charging connection and a power supply support for releasably supporting the power supply during charging; wherein
  the power supply compartment is arranged in the upper part of the container handling vehicle and is configured to receive the replaceable power supply via an opening facing towards the first direction or the second direction.

In other words, the power supply compartment is arranged at a level above the level of the at least one storage compartment. The power supply compartment may extend directly above the at least one storage compartment.

In an embodiment of the system, the power supply support is arranged to extend into the power supply compartment to retrieve a discharged power supply or insert a charged power supply.

The power supply support is arranged such that the supported power supply may only be released in an upwards direction relative the power supply support.

By having the power supply support arranged to extend into the power supply compartment, the power supply may be introduced to a position within the vehicle being laterally separate from a side (or the horizontal circumference) of the container handling vehicle while at the same time being kept sufficiently stable for reliable coupling of the power supply to a connector of the vehicle In an embodiment of the system, the power supply compartment comprises a power supply locking assembly arranged to hold the power supply in place within the power supply compartment.

In other words, the power supply assembly is arranged to prevent an accommodated power supply from moving relative to the power supply compartment. In other words, the power supply locking assembly prevents the power supply from moving laterally/horizontally relative the power supply compartment.

In an embodiment of the system, the power supply locking assembly is moveable between a first position, in which the power supply locking assembly may hold the power supply in place, and a second position, wherein the power supply may be moved.

In an embodiment of the system, the power supply locking assembly is locked in the first position by a releasable locking mechanism.

In an embodiment of the system, the power supply support is arranged to interact with the releasable locking mechanism and/or the power supply locking assembly, such that the power supply locking assembly may move into the second position when the power supply support is extended into the power supply compartment to retrieve a discharged power supply or insert a charged power supply.

The releasable locking mechanism may comprise at least one pivot arm arranged to interact with the power supply support, such that the locking mechanism is released.

In an embodiment of the system, the power supply locking assembly is pivotably connected to the upper part of the container handling vehicle, such that the power supply locking assembly may pivot between the first and second position.

In an embodiment of the system, the power supply support comprises two laterally extending guide arms between which the replaceable power supply may be supported.

At least a section of each guide arm may be arranged to extend into the power supply compartment and/or at least an end section of at least one guide arm may be arranged to extend into the power supply compartment and/or at least the section of the guide arms between which the power supply may be supported is arranged to extend into the power supply compartment In an embodiment of the system, at least one of the guide arms comprises an end for interaction with the releasable locking mechanism and/or the power supply locking assembly.

In other words, at least one of the guide arms may comprise an end for interaction with the releasable locking mechanism and/or the power supply locking assembly, such that the power supply locking assembly may move into the second position. The end of at least one of the guide arms may be wedge-shaped.

In an embodiment of the system, the replaceable power supply comprises a support rib arranged on each of two opposite sides of the power supply, each support rib arranged to interact with a corresponding guide arm of the power supply support. The support ribs may extend laterally/horizontally at opposite sidewalls of the power supply.

In an embodiment of the system, each support rib comprises a recess or protrusion for interaction with a corresponding protrusion or recess, respectively, arranged on the guide arms.

In an embodiment of the system, the interacting recesses and protrusions are arranged such that the power supply is prevented from lateral movement when supported by the power supply support.

In an embodiment of the system, the power supply locking assembly comprises locking elements, the locking elements arranged to interact with the power supply, optionally via support ribs arranged on each of two opposite sides of the power supply, when the power supply is arranged in the power supply compartment and the power supply locking assembly is in the first position, such that the power supply is prevented from moving in at least a lateral direction.

In an embodiment of the system, the locking elements are arranged on two longitudinal sidewalls interconnected by a structural element, such that the sidewalls are fixed relative to each other.

In an embodiment of the system, the structural element is a power supply cover arranged to at least partly cover the power supply when the power supply is arranged in the power supply compartment and the power supply locking assembly is in the first position.

In an embodiment of the system, the power supply locking assembly is pivotably connected to the upper part of the container handling vehicle via the two longitudinal sidewalls, the structural element or the power supply cover.

In an embodiment of the system, the wheel assembly comprises a first set of wheels, arranged to engage with the first set of tracks, and a second set of wheels, arranged to engage with the second set of tracks, the first set of wheels is moveable between an upper and a lower wheel position, such that the first set of wheels engage with the first set of tracks in the lower wheel position and the second set of wheels engage with the second set of tracks in the upper wheel position.

In other words, the first set of wheels is moveable between an upper and lower position relative the upper part of the container handling vehicle, such that the level of the power supply compartment relative the first and second set of tracks is moveable between a lower and an upper level, respectively.

In an embodiment of the system, the power supply locking assembly is arranged to be in the first position when the power supply support extends into the power supply compartment and the first set of wheels is in the lower wheel position.

In an embodiment of the system, the power supply locking assembly is arranged to be in the second position when the power supply support extends into the power supply compartment and the first set of wheels is in the upper wheel position.

In an embodiment of the system the power supply is arranged to be supported by the power supply support, when the power supply support extends into the power supply compartment and the first set of wheels is in the upper wheel position.

In an embodiment of the system, the power supply is arranged to be separate from the power supply support and supported by at least one support surface arranged inside the power supply compartment, when the power supply support extends into the power supply compartment and the first set of wheels is in the lower wheel position. The at least one support surface may be an upwards facing surface.

In an embodiment of the system, the power supply support is arranged at a fixed level relative the track system, and the charging connection is movable between a lower connection position and an upper connection position relative the track system;

in the lower connection position, the charging connection is arranged at a level corresponding to the level of the power supply charging connection when the power supply is supported by the power supply support; and in the upper connection position, the charging connection is arranged at a level corresponding to the level of the power supply charging connection when the power supply is accommodated in the power supply compartment and the first set of wheels is in the lower wheel position.

The charging connection may also be defined as being movable between the lower connection position and the upper connection position relative the power supply support.

In an embodiment of the system, the charging connection is biased towards the upper connection position.

In other words, when the power supply support does not support a power supply, the charging connection will be in the upper connection position. The charging connection may be biased towards the upper connection position by any suitable resilient element, such as a spring.

The charging connection and the power supply charging connection may be a plug/socket connection. The charging connection may be a charging socket and the power supply charging connection may be a corresponding power supply charging plug, or vice versa.

In a second aspect, the present invention provides a charging station for a replaceable power supply comprising a power supply charging connection, wherein the charging station comprises a charging connection configured to create an electrical connection with the power supply charging connection and a power supply support for releasably supporting the power supply during charging, wherein the charging connection may move between a lower connection position and an upper connection position relative the power supply support; and in the lower connection position, the charging connection is arranged at a level corresponding to the level of the power supply charging connection when the power supply is supported by the power supply support; and the charging connection is biased towards the upper connection position, such that the charging connection is in the upper connection position when the power supply support is not supporting a power supply.

In an embodiment of the charging station, the power supply support comprises two laterally extending guide arms by which the replaceable power supply may be supported, at least one guide arm comprises a wedge-shaped end extending beyond a section of the guide arms by which the power supply may be supported.

In an embodiment of the charging station, the power supply support comprises two laterally extending guide arms between which the replaceable power supply may be supported, at least one guide arm comprises a wedge-shaped end extending beyond a section of the guide arms between which the power supply may be supported.

In an embodiment of the charging station, each guide arm comprises a wedge-shaped end extending beyond the section of the guide arms between, or by, which the power supply may be supported.

In an embodiment of the charging station, the section of each guide arm comprises at least one recess or protrusion for interaction with the power supply, such that lateral movement of a supported power supply is prevented. In other words, the section of each guide arm comprises at least one recess or protrusion for interaction with the power supply, such that lateral movement of a supported power supply relative the charging connection is prevented.

The charging station may comprise any of the features present in the charging station of the system according to the first aspect.

In a third aspect, the present invention provides a container handling vehicle for an automated storage system according to any embodiment of the first aspect, featuring a lower part comprising at least one storage compartment for storing a storage container, an upper part arranged vertically above the lower part, a wheel assembly for guiding the container handling vehicle along a track system and a power supply compartment for accommodating a replaceable power supply, wherein the wheel assembly comprises a first set of wheels, arranged to engage with a first set of tracks of the track system, and a second set of wheels, arranged to engage with a second set of tracks of the wheel system, the first set of wheels can be moved between an upper and a lower position, such that the first set of wheels engage with the first set of tracks in the lower position and the second set of wheels engage with the second set of tracks in the upper position, wherein the power supply compartment is arranged to receive the replaceable power supply via an opening facing in the direction in which the vehicle may move when the first set of wheels are in the lower position.

In an embodiment of the container handling vehicle, the power supply compartment comprises a power supply locking assembly arranged to hold the power supply in place within the power supply compartment, the power supply locking assembly is pivotably connected to the upper part of the container handling vehicle, such that the power supply locking assembly may pivot between a first position, in which the power supply locking assembly may hold the power supply in place, and a second position, wherein the power supply may be moved.

In an embodiment of the container handling vehicle, the power supply locking assembly is locked in the first position by a releasable locking mechanism.

The container handling vehicle may comprise any of the features present in the container handling vehicle of the system according to the first aspect.

A method of charging a power supply accommodated within a power supply compartment of a container handling vehicle using a charging station comprising a power supply support,
the container handling vehicle being configured to move
on a track system comprising a first set of parallel tracks arranged in a horizontal plane and extending in a first direction, and a second set of parallel tracks arranged in the horizontal plane and extending in a second direction which is orthogonal to the first direction, said first and second sets of tracks forming a grid pattern in the horizontal plane comprising a plurality of adjacent grid cells, each grid cell comprising a grid opening defined by a pair of adjacent tracks of the first set of tracks and a pair of adjacent tracks of the second set of tracks;

the method comprises the following steps:
moving the container handling vehicle to a position where the power supply support of the charging station is at least partly entering the power supply compartment containing the power supply and where at least one charging connection of the charging station is set in electrical contact with at least one power supply charging connection of the power supply,
transferring the power supply from the power supply compartment of the container handling vehicle to the power supply support and
reversing the container handling vehicle, leaving the power supply at charge on the charging station.

In an embodiment of the method, the transfer of the power supply from the power supply compartment of the container handling vehicle to the power supply support is achieved by adjusting the height of the power supply compartment relative to the underlying track system.

In an embodiment of the method, the power supply compartment is in an upper position relative to the track system during step a).

In an embodiment of the method, the container handling vehicle comprises a lower part displaying at least one storage compartment for storing a storage container and an upper part arranged vertically above the lower part, wherein the power supply compartment is located in the upper part of the container handling vehicle.

In the method according to the third aspect, the container handling vehicle and the charging station may comprise any of the features defined in the embodiments of the first, second and third aspect.

In an embodiment of the method, the wheel assembly comprises a first set of wheels, arranged to engage with the first set of tracks, and a second set of wheels, arranged to engage with the second set of tracks, the first set of wheels is moveable between an upper and a lower wheel position, such that the first set of wheels engage with the first set of tracks in the lower wheel position and the second set of wheels engage with the second set of tracks in the upper wheel position.

In an embodiment of the method, the first set of wheels is moved to the upper wheel position in step b), and in the lower wheel position during step a).

The charging station may further comprise a power supply support for releasably supporting, or releasably holding, or releasably suspending, the power supply during charging. In this configuration, the power supply support may be arranged at a vertical height D above the track system in level with, or approximately in level with, the corresponding vertical height of the at least one opening of the power supply cover of the container handling vehicle, or in vertical height with the at least one power supply compartment.

The charging station is preferably arranged at, or adjacent to, a perimeter of the track system and extend a distance into the track system along the horizontal plane (P). Note however that the charging station may in general be placed anywhere on or outside the track system as long as the charging station is within reach of the container handling vehicle.

In addition to the power supply support, the charging station may further comprise a charging station column comprising a lower end attached directly or indirectly to the track system. In this configuration, the power supply support is preferably arranged on, at, or near, the charging station column at a vertical height D relative to the track system being equal or higher than the corresponding vertical height of the lower part of the container handling vehicle. With this configuration, the power supply may enter the power supply department arranged above the storage compartment without the need of, or a minimum need of, additional vertical adjustments during power supply exchange.

The power supply support of the charging station may be arranged at a vertical distance D from the track system being equal or near equal to the vertical height of the power supply within the container handling vehicle, wherein the power supply support is configured to releasably support the power supply during charging.

Further, the charging station may comprise a charging station column comprising a lower end fixed at or near the horizontal plane of the track system.

The power supply support may comprise two guiding pins (i.e. guiding arms) having a horizontal separation, wherein the two guiding pins extends a distance L from an outer perimeter of the charging station column. The end of each guiding pin opposite the upper end may advantageously be wedge-shaped, to aid the insertion into the power supply compartment and/or to activate a release mechanism allowing a successful insertion of the power supply in the power supply compartment. Note that wedge-shaped is defined as a tapered end surface relative to the guiding pins' upper and lower surfaces.

The power supply may have a depth corresponding to the size of the power supply in the first direction (X), a width corresponding to the size of the power supply in the second direction (Y) and a height corresponding to the size of the power supply perpendicular to the horizontal plane (P), the horizontal separation distance between the above mentioned two guiding pins is preferably equal or less than the power supply width.

Further, the lower end of the charging station column may comprise a charging station base plate arranged within or on the first set of parallel tracks and the second set of parallel tracks of the track system.

The charging connection may vertically displaceable relative to the track system, for example resiliently connected to the charging station column.

The invention also concerns a method of charging a power supply arranged within a power supply compartment of a container handling vehicle using a charging station comprising a power supply support.

The power supply may be any device capable of generating electrical power such as a battery or a capacitor.

The charging station may comprise a charging station column which further comprises a lower end adapted for being mounted to a track system comprising a first set of parallel tracks arranged in a horizontal plane (P) and extending in a first direction (X), and a second set of parallel tracks arranged in the horizontal plane (P) and extending in a second direction (Y) which is orthogonal to the first direction (X) and an upper end extending a distance from the lower end. The distance may be equal or higher than the vertical height of the lower part of the container handling vehicle when operating on the track system, for example equal or higher than 20 cm or 25 cm or 30 cm. The latter heights represent typical heights of storage containers stored within an automated storage and retrieval system. Alternatively, the distance may be equal or higher than the height of the container handling vehicle.

The height of the container handling vehicle is hereinafter defined as the vertical distance from the lowermost position contacting the track system to the uppermost position of the vehicle, excluding any sharp protruding parts such as antennas or the like.

The charging station further comprises a power supply support fixed either on the upper end, at the upper end or at a location near the upper end, for example within a distance from the termination of the upper end being equal or less than 20% of the total distance of the charging station column. A distance D from the lower end of the charging station column to the power supply support may equal or near equal to the vertical height of the power supply arranged above the lower part of the container handling vehicle when operating on the track system. The distance D may for example be equal or higher than typical heights of the storage containers stored within the automated storage and retrieval system, i.e. equal or higher than 20 cm, or 25 cm, or 30 cm.

The power supply support may be configured to releasably support, hold or suspend the power supply during charging.

The power supply support may extend a distance L from an outer perimeter of charging station column, preferably the outer perimeter of the upper end, wherein the distance L is equal or near equal a geometrical size of the power supply, the geometrical size being one of the length, the width, the diagonal and the diameter. For example, if the power supply has an overall shape as a rectangular box with a width, height and depth, the depth being the length between the front wall and the back wall of the power supply, the distance L can be equal or near equal to the depth of the power supply.

In addition, or alternatively, the distance L may be the distance from the outer perimeter of the charging station column, for example the outer perimeter of the upper end, to the horizontal centre point of the vehicle, or near the horizontal centre point of the vehicle, when the vehicle is in a charging position.

The term 'near the horizontal centre point' may for example be defined as a horizontal distance from the true horizontal centre point being less than ¼ of the horizontal extent of the vehicle in the direction of the power supply support.

Moreover, the power supply support may comprise two guiding pins (i.e. guiding arms) extending a distance L from an outer perimeter of the charging station column. The horizontal separation between the two guiding pins may be equal or near equal to a geometrical size of the power supply as mentioned above, for example equal or near equal to the width of the power supply in case of a rectangular box shape. The two guiding pins are preferably mutually aligned in the horizontal plane (P).

The ends of the guiding pins may have a distinct form, such as wedge-shape, to interact with a release mechanism arranged at or near the entrance opening of the power supply compartment within the container handling vehicle during operation. The wedge shape may for example activate pivoting of a pivot arm constituting part of the release mechanism, and where the pivoting movement of the pivot arm allows the power supply to slide into the power supply compartment. Other mechanism may however be envisaged such as a release mechanism based on translational movements or a combination of pivoting movements and translational movements.

The lower end of the charging station column may comprise a charging station base plate to allow a stable coupling to the track system. The charging station base plate is configured to be fitted within the first set of parallel tracks and the second set of parallel tracks of the track system. For example, the perimeter of the base plate may be fixed to two or more inner side walls of the tracks within a grid cell. Alternatively, or in addition, the base plate may be mounted on the tracks, but such that the base plate is not interfering with the wheels of the container handling vehicle when the vehicle enters the respective grid cell.

The charging station may further comprise a charging connection such as an electrical socket or an electrical plug arranged on the charging station column, preferably on the upper half of the charging station column, more preferably on a location of the column laying within a distance from the termination of the upper end being equal or less than 25% of the total distance of the charging station column. The charging connection is adapted for establishing electrical communication with the power supply to be charged via a corresponding power supply charging connection arranged on the power supply.

Further, the charging connection may advantageously be vertically displaceable relative to the charging station column. In one configuration, the charging connection may be resiliently connected to the charging station column, for example by a spring system where the charging connection is biased towards an upper position.

The container handling vehicle may comprise a container-receiving storage space for accommodating a storage container; a lifting device arranged to transport a storage container vertically between a storage position in a stack and a transport position in the storage space. The lifting device may comprise a gripping device being configured to releasably grip a storage container; and a lifting motor being configured to raise and lower the gripping device relative to the storage space.

The container-receiving storage space may be arranged centrally within the lower part of the container handling vehicle.

The rolling device may comprise wheels which are arranged around the periphery of the storage space.

By arranging the power supply compartment and the power supply above the storage compartment, the power supply may be placed deeper into the vehicle without reducing the available storage space for the container.

In addition, the arrangement of the power supply deeper into the horizontal extension of the vehicle, that is, nearer or at to the vehicle's gravitational centre axis, the overall stability conditions for the vehicle is increased.

In the following, numerous specific details are introduced by way of example only to provide a thorough understanding of embodiments of the claimed charging station, the system and the method. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

BRIEF DESCRIPTION OF DRAWINGS

Following drawings are appended to facilitate the understanding of the invention. The drawings show embodiments of the invention, which will now be described by way of example only, where:

FIG. 13A is a perspective view of the charging station and FIGS. 13B and C are side views of the charging station along X direction and Y direction, respectively.

FIGS. 14A-F show in sequence a power storage source being transferred from the charging station to a power storage source compartment of the vehicle.

FIG. 22 is a detailed view of the charging station in FIG. 21.

In the drawings, like reference numerals have been used to indicate like parts, elements or features unless otherwise explicitly stated or implicitly understood from the context.

DETAILED DESCRIPTION

Figure 1:
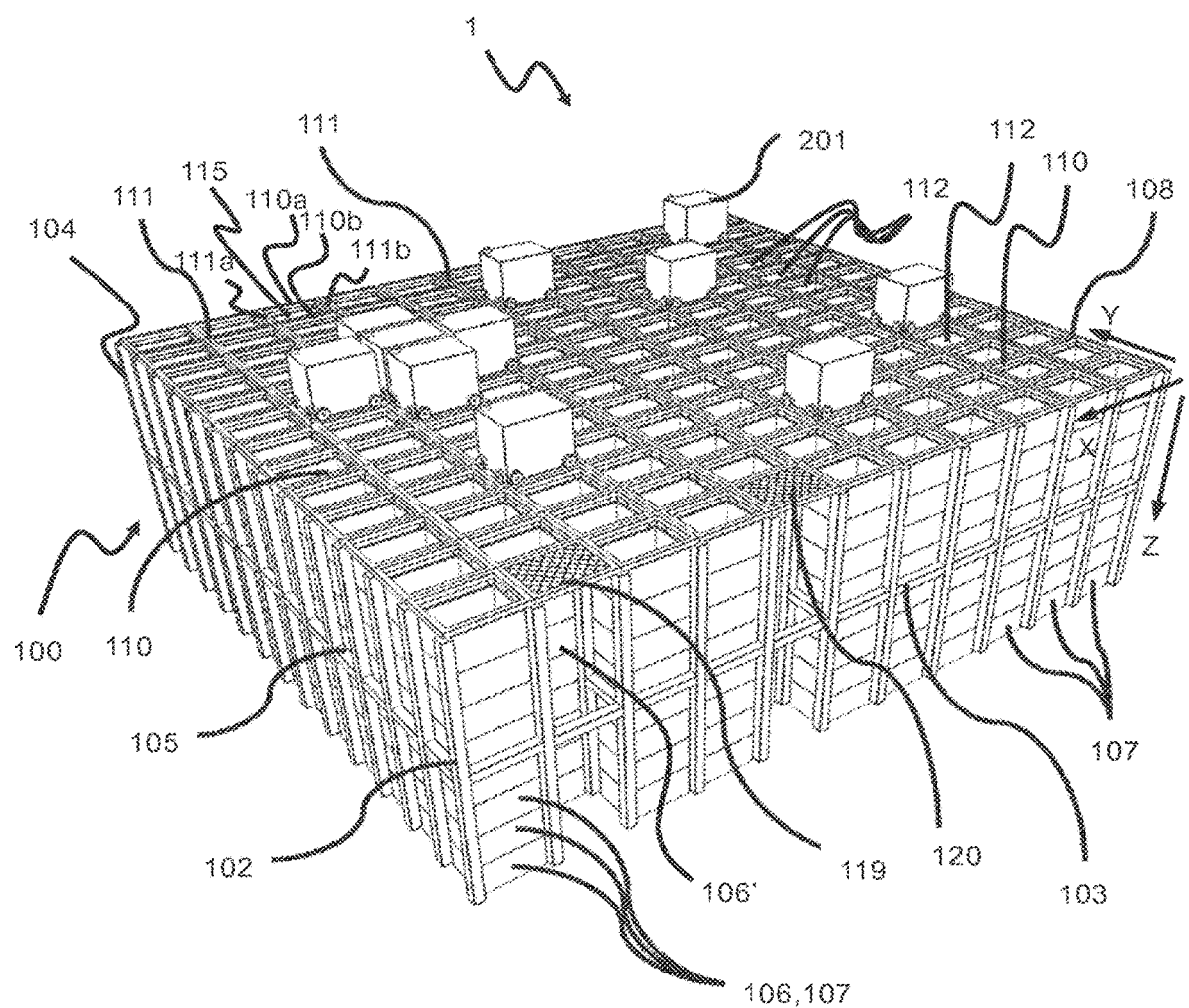
FIG. 1 is a perspective view of a grid of a prior art automated storage and retrieval system.
Figure 2:
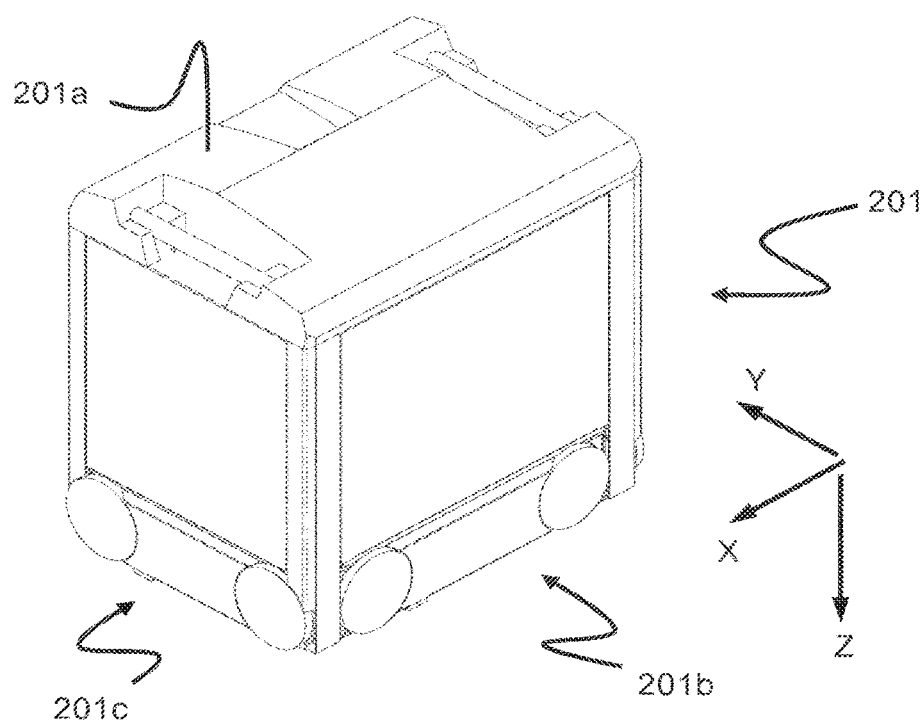
FIG. 2 is a perspective view of a prior art container handling vehicle having a centrally arranged cavity for containing storage containers therein.
Figure 3:
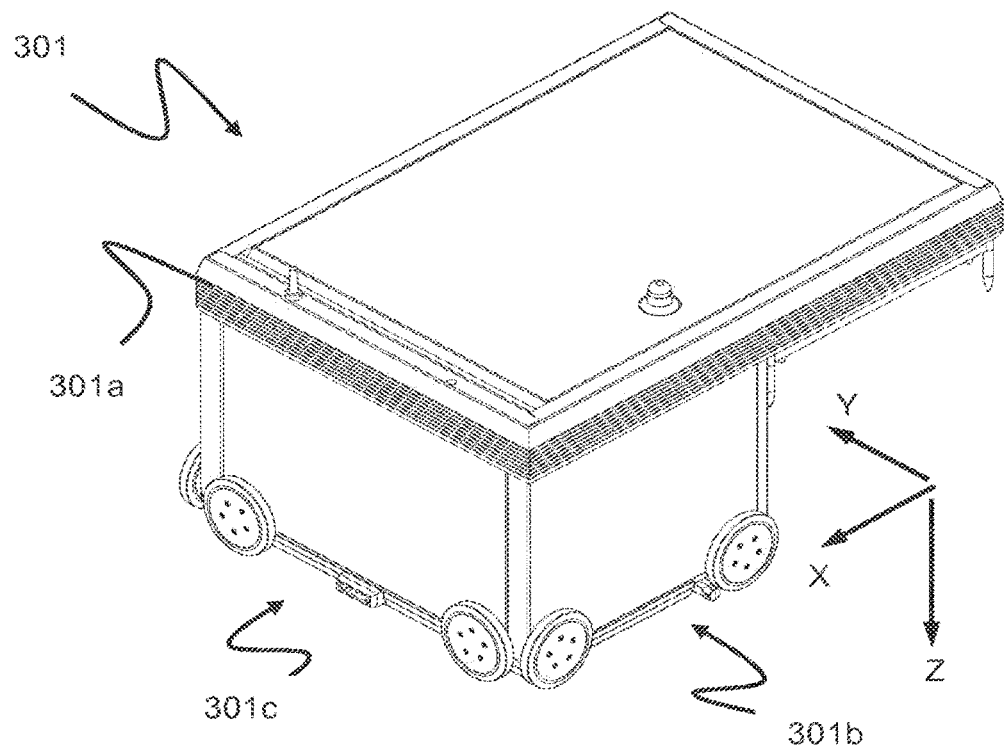
FIG. 3 is a perspective view of a prior art container handling vehicle having a cantilever for containing storage containers underneath.

In the following, embodiments of the invention will be discussed in more detail with reference to the appended drawings. It should be understood, however, that the drawings are not intended to limit the invention to the subject-matter depicted in the drawings.

Figure 4:
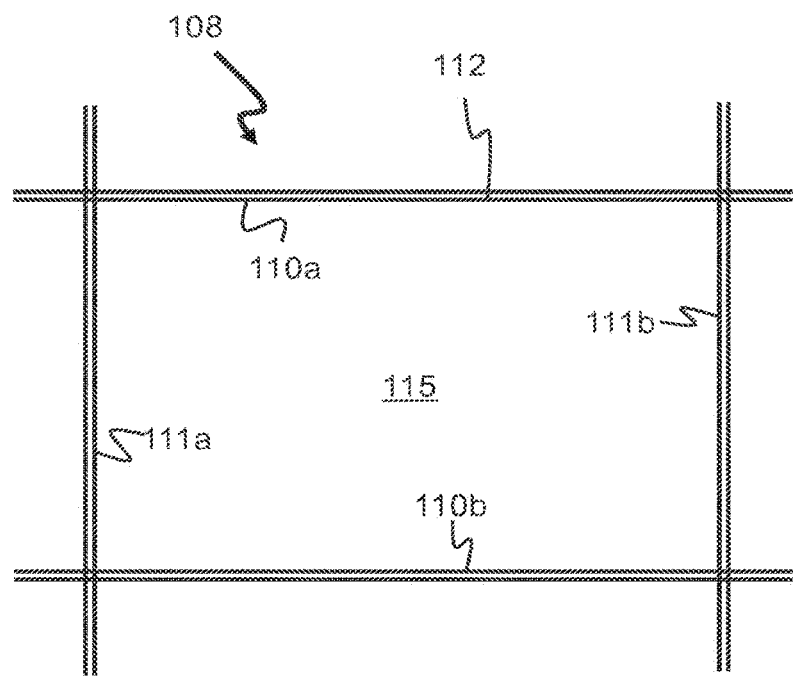
FIG. 4 is a top view of a prior art single rail grid.

The framework 100 of the automated storage and retrieval system 1 is constructed in accordance with the prior art framework 100 described above in connection with FIGS. 1-6, i.e. a number of upright members 102 and a number of horizontal members 103, which are supported by the upright members 102, and further that the framework 100 comprises a track system 108 of parallel tracks 110,111 in X direction and Y direction arranged across the top of storage columns 105/grid columns 112. The horizontal area of a grid column 112, i.e. the area along the X and Y directions, may be defined by the distance between adjacent rails 110 and 111, respectively (see FIGS. 4-6).

In FIG. 1 the grid 104 is shown with a height of eight cells. It is understood, however, that the grid 104 in principle can be of any size. In particular it is understood that grid 104 can be considerably wider and/or longer and/or deeper than disclosed in FIG. 1. For example, the grid 104 may have a horizontal extent of more than 700×700 grid cells and a depth of more than twelve grid cells.

One embodiment of the automated storage and retrieval system according to the invention will now be discussed in more detail with reference to FIGS. 7 to 12.

The exact configuration of the container handling vehicle 3 shown in the figures may vary. However, all vehicles 3 of of the automated storage and retrieval system 1 comprise a vehicle body 17 and a wheel assembly 18 (or any other rolling means/rolling device) arranged in a lower section or part 17a (see FIG. 12) of the vehicle body 17 to enable the lateral movement of the container handling vehicle 3, i.e. the movement of the vehicle 3 in the X and Y directions (see FIGS. 7-8).

Figure 8:
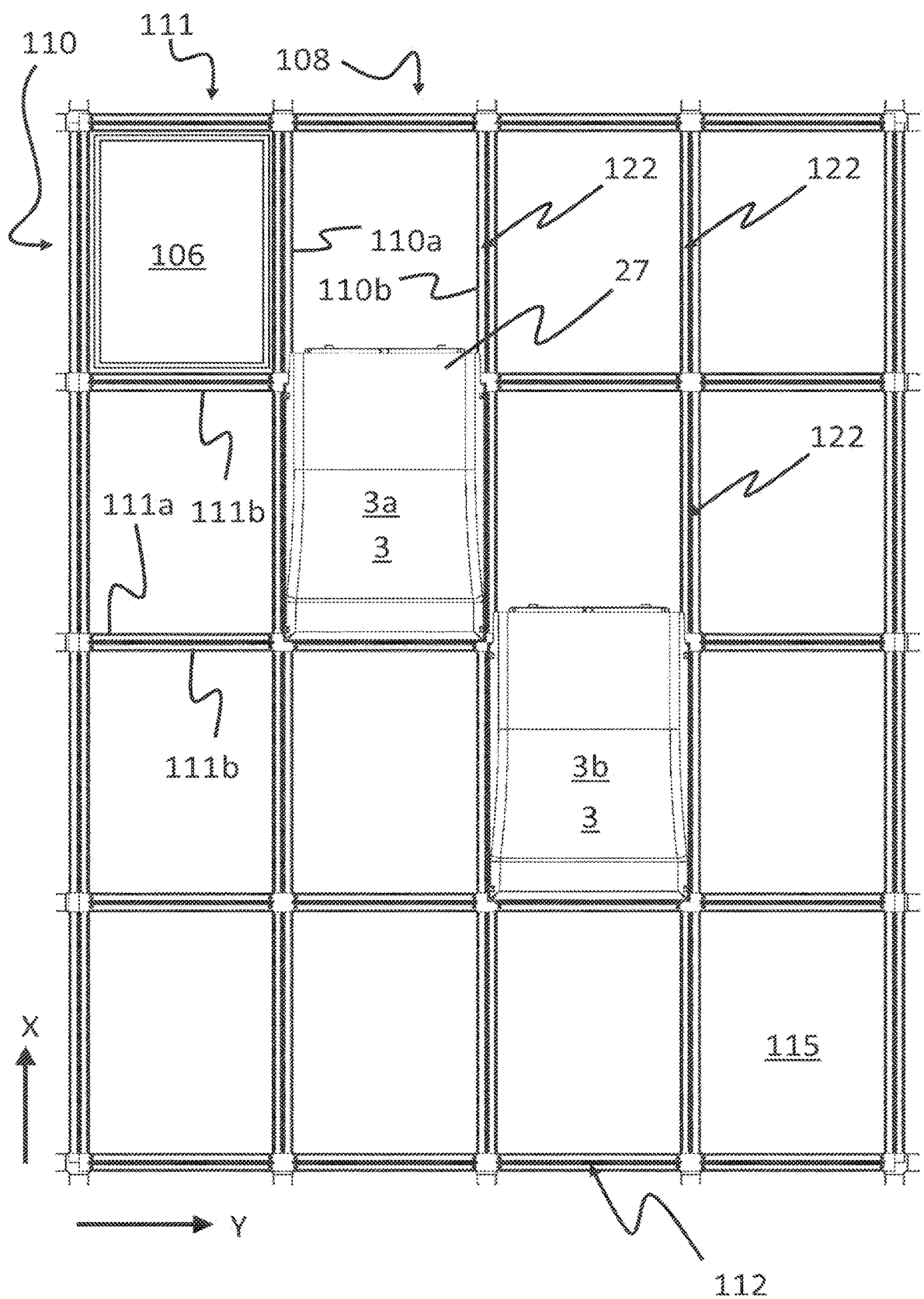
FIG. 8 is a top view of the automated storage and retrieval system of FIG. 7.

The wheel assembly/rolling device 18 comprises a first set of wheels 19, which is arranged to engage with a pair of tracks 110a, 110b of the first set of tracks 110, and a second set of wheels 20, which is arranged to engage with a pair of tracks 111a, 111b of the second set of tracks 111 (see FIG. 8). At least one of the set of wheels 19, 20 can be lifted and lowered, so that the first set of wheels 19 and/or the second set of wheels 20 can be brought to engage with the respective set of tracks 110, 111 at any one time. The lifting/lowering procedure can for example be performed by lifting side plates 25 (see FIG. 12) attached to the respective wheels 19,20 by use of a lifting motor arranged in the upper part 17b of the vehicle 3.

Each set of wheels 19, 20 comprises four wheels 19a, 19b, 19c, 19d; 20a, 20b, 20c, 20d arranged along the sides of the vehicle 3. The wheels 19a and 19b are arranged in a first vertical plane, and the wheels 19c and 19d are arranged in a second vertical plane which is parallel to the first vertical plane and arranged at a distance from the first vertical plane which corresponds to the distance between rails 110a and 110b (see e.g. FIG. 8). The wheels 20a and 20b are arranged in a third vertical plane, which is orthogonal to the vertical planes in which the wheels 19a, 19b, 19c and 19d are arranged, and the wheels 20c and 20d are arranged in a fourth vertical plane which is parallel to the third vertical plane and arranged at a distance from the third vertical plane which corresponds to the distance between the rails 111a and 111b.

At least one of the wheels in each set 19, 20 is motorized in order to propel the vehicle 3 along the track system 108. Advantageously, the at least one motorized wheel in each set 19, 20 comprises a hub motor, i.e. an electric motor that is coupled to, or incorporated into, the hub of a wheel and drives the wheel directly. An example of a container handling vehicle with such a motor is disclosed in WO2016/120075A1, the contents of which are incorporated herein by reference.

Each container handling vehicle 3 comprises a storage compartment or bin storage space 24 arranged within the lower part 17a of the vehicle body 17 (see FIG. 12) for receiving and holding a storage container 106 when transporting the storage container 106 across the track system 108 (see FIG. 8). The bin storage space 24 can be accessed from below, i.e. from an opening at the bottom of the container handling vehicle 3. In the particular vehicle configuration shown in FIGS. 7-16, the bin storage space 24 is arranged centrally or substantially centrally within the vehicle body 17.

Each container handling vehicle 3 also comprises a lifting device 21 (see FIGS. 10 and 12) for vertical transportation of a storage container 106, e.g. lifting a storage container 106 from a storage column 105 and bringing it into the bin storage space 24, and also for lowering a storage container 106 from the storage space 24 into a storage column 105. The lifting device 21 comprises a gripping device 22 which is arranged to releasably engage with a storage container 106. The lifting device 21 also comprises a motorized lifting mechanism 23 for lowering and raising the gripping device 22 so that the position of the gripping device 22 with respect to the vehicle body 17 can be adjusted in a third direction Z, i.e. orthogonal the first direction X and the second direction Y (see also FIG. 7). In the vehicle configuration illustrated in FIGS. 10 and 12 the gripping device 22 comprises remotely operated claws 22a attached underneath a lifting plate 22b. The lifting plate 22b may be connected to a plurality belts (not shown) constituting part of the motorized lifting mechanism 23.

The motorized lifting mechanism 23 is arranged in the upper part 17b of the vehicle body 17 (see FIG. 12), below a battery cover or house 27 for mounting of a chargeable battery 28 (see FIG. 10) and above the lower part 17a with the bin storage space 24.

When a storage container 106 stored in the storage grid 104 is to be accessed, one of the container handling vehicles 3 is instructed to retrieve the target storage container 106 from its position in the storage grid 104 and to transport the target storage container 106 to an access station (not shown) where it can be access from outside of the storage grid 104 or transferred out of the storage grid 104. This operation involves moving the container handling vehicle 3 to the grid cell 122 above the storage column 105 in which the target storage container 106 is positioned and retrieving the storage container 106 from the storage column 105 using the container handling vehicle's lifting device 21. The lifting device 21 lifts the storage container 106 from the storage column 105 through the grid opening 115 of the grid cell 122 and into the storage space 24 of the vehicle 3.

If the target storage container 106 is located deep within a stack 107 (shown in FIG. 1), i.e. with one or a plurality of other storage containers positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle 3 that is subsequently used for transporting the target storage container 106 to the access station, or with one or a plurality of other cooperating container handling vehicles 3. Alternatively, or in addition, the automated storage and retrieval system 1 may have container handling vehicles specifically dedicated to the task of temporarily removing storage containers from a storage column 105, for example the multi-container handling vehicle 5 shown in FIG. 19. Once the target storage container 106 has been removed from the storage column 105, the temporarily removed storage containers can be repositioned into the original storage column 105. The removed storage containers may alternatively, or in addition, be relocated to other storage columns.

Once the target storage container 106 has been brought into the storage space 24 of the container handling vehicle 3, the vehicle 3 transports the storage container 106 to the access station where it is unloaded. The access station may typically comprise a grid location at the periphery of the storage grid 104 where the storage container 106 can be accessed manually or transported further using a suitable conveyor system (not shown).

When a storage container 106 is to be stored in the storage grid 104, one of the container handling vehicles 3 is instructed to pick up the storage container 106 from a pick-up station (not shown), which may also double as an access station, and transport it to a grid cell 122 above the storage column 105 where it is to be stored. After any storage containers positioned at or above the target position within the storage column stack 107 have been removed, the container handling vehicle 3 positions the storage container 106 at the desired position. The removed storage containers may then be lowered back into the storage column 105 or relocated to other storage columns within the storage grid 104.

For monitoring and controlling the automated storage and retrieval system 1 so that a desired storage container 106 can be delivered to the desired location at the desired time without the container handling vehicles 3 colliding with each other, the automated storage and retrieval system 1 comprises a control system, which typically is computerised and comprises a database for monitoring and controlling e.g. the location of the respective storage containers 106 within the storage grid 104, the content of each storage container 106 and the movement of the container handling vehicles 3. Each vehicle 3 should thus be equipped with onboard control and communication system 35 comprising suitable transmission and receiving means (i.e. a transmitter-receiver system) to enable transmission and receival of signals from and to the remotely situated control system. The container handling vehicles 3 typically communicates with the control system via wireless communication means, e.g. via a WLAN operating under an IEEE 802.11 (WiFi) standard and/or utilising a mobile telecommunication technology such as 4G or higher.

Each container handling vehicle 3 comprises a battery 28 (i.e. a replaceable power supply) which provides power to onboard equipment, including the motorised rolling device 18, the motorised lifting mechanism 23 and the onboard control and communications systems 35.

Each of the container handling vehicles 3 shown in FIGS. 7-12 and FIGS. 14-16 has a footprint, i.e. a contact area against the track system 108, which has a horizontal extension or area which is equal to or less than the horizontal area of a grid cell 122. In other words, when the vehicle 3 is positioned above a grid cell 122, e.g. for lifting a storage container 106 from or lowering a container 106 into a storage column 105, the footprint of the vehicle 3 will not extend beyond the grid cell 122 into a neighbouring grid cell 122. The wheels 19a-19d, 20a-20d are arranged around the periphery of the bin storage space 24, and the footprint of the vehicle 3 is larger than the storage space 24 only enough to accommodate the wheels 19a-19d, 20a-20d. In this way, the footprint of the vehicle 3 takes up the minimum possible amount of space in the X-Y plane. Since the bin storage space 24 is positioned between the pair of wheels, i.e. the pairs 19a and 19b, 19c and 19d, 20a and 20b and 20c and 20d, the centre of gravity of the vehicle 3 will be located within the footprint 30 also when a storage bin 106 is raised into the storage space 24.

Further, the vehicle 3 comprises generally vertical side walls 26a-26d (see FIGS. 7, 9-11 and 14-16), which are co-planar to the vertical planes in which the wheels 19a 19d; 20a-20d are arranged. Consequently, the lower part of the container handling vehicle 3 has a generally cuboid shape.

Figure 7:
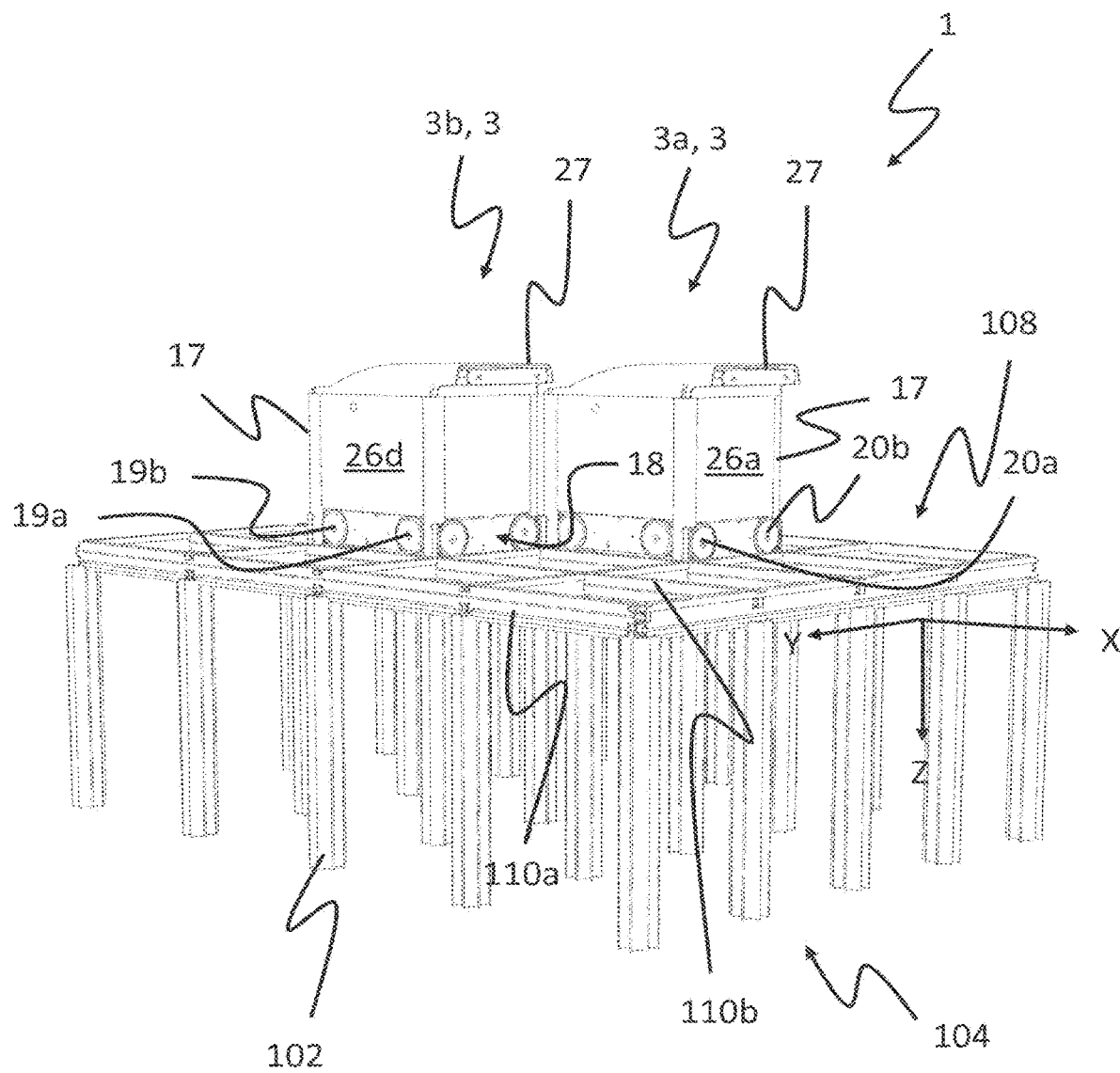
FIG. 7 is a perspective view of an automated storage and retrieval system comprising two container handling vehicles according to one exemplary embodiment of the invention.
Figure 9:
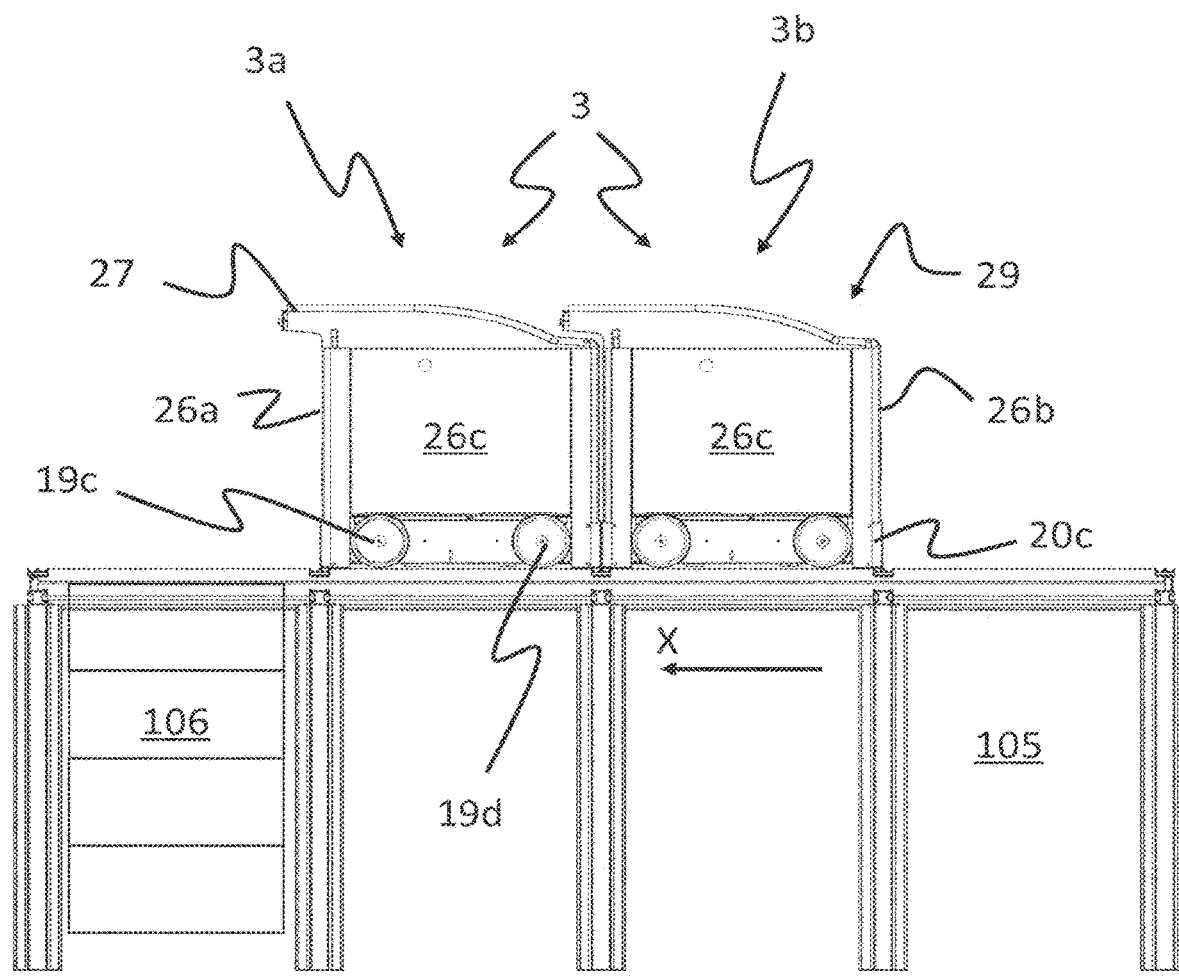
FIG. 9 is a side view of the automated storage and retrieval system according to FIGS. 7 and 8.
Figure 10:
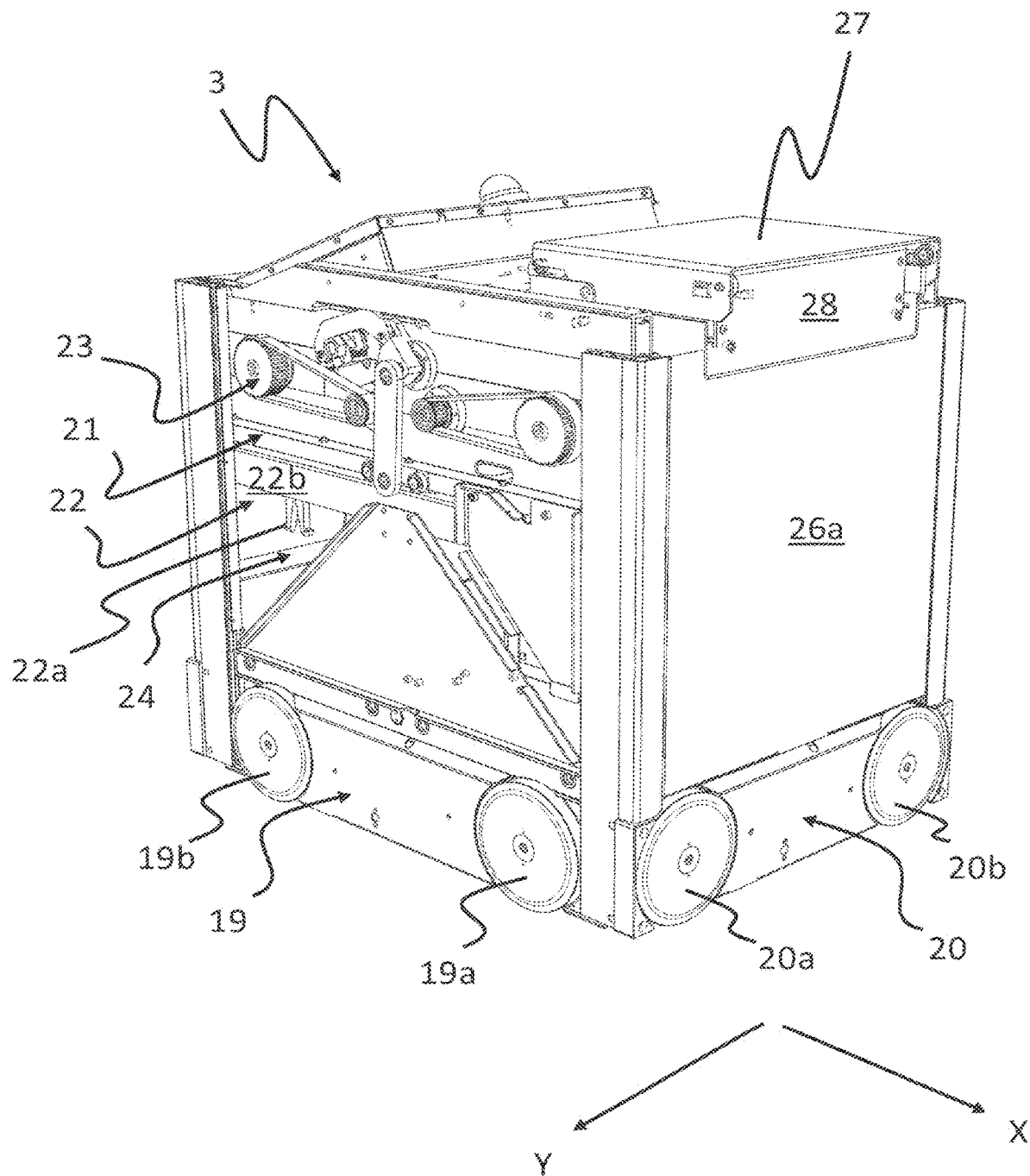
FIG. 10 is a perspective view of a container handling vehicle according to FIGS. 7 to 9, in which view a top cover and a side panel of the vehicle are removed.
Figure 11:
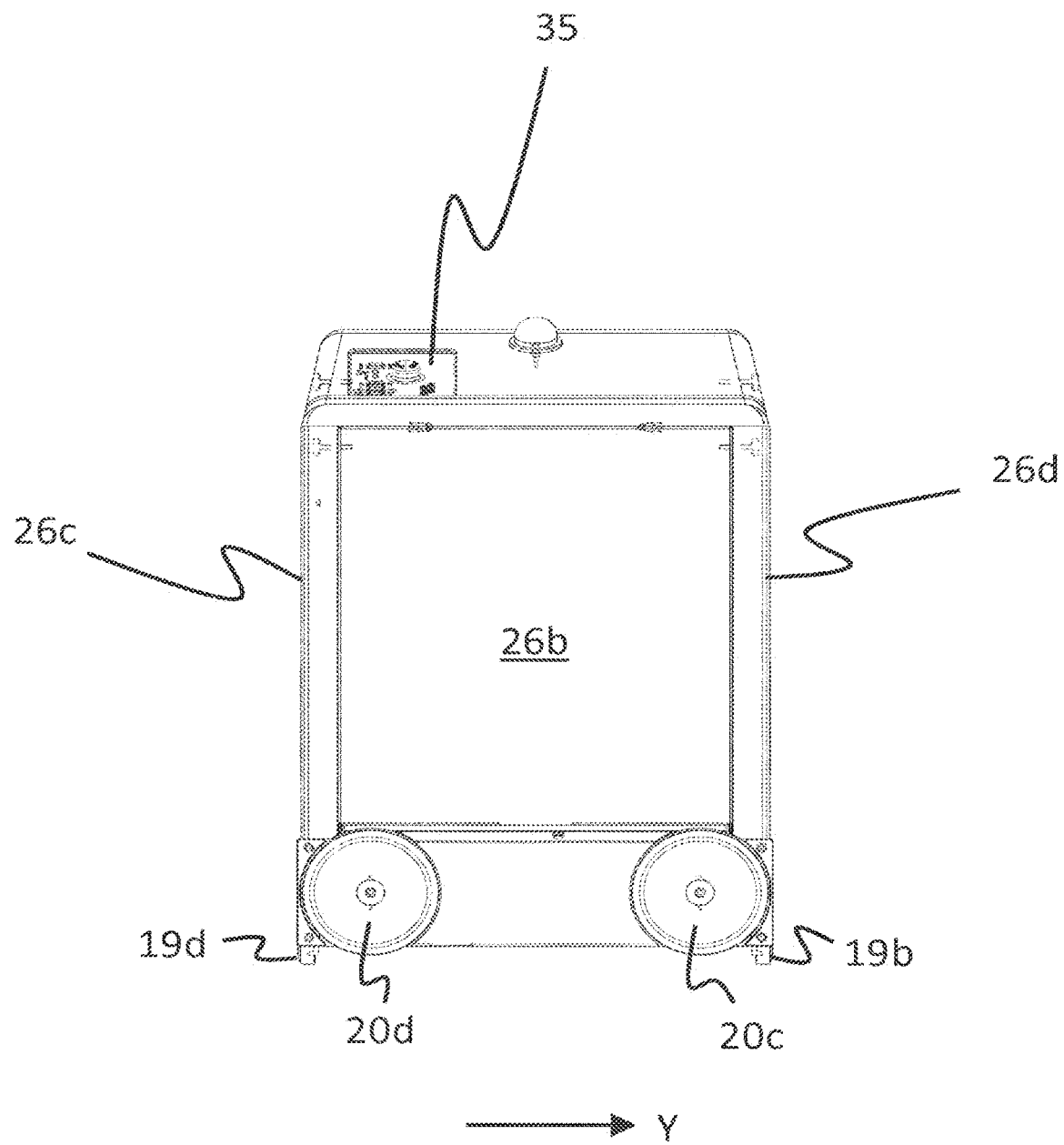
FIG. 11 is a side view of the container handling vehicle according to FIG. 10.

As mentioned above, the upper part 17b of the vehicle 3 (see FIG. 12) includes a battery cover 27 which may protrude horizontally in the X direction beyond the otherwise generally vertical side walls 26c and 26d (see e.g. FIGS. 7, 9 and 10). This protruding battery cover 27 is configured to house the battery 28 of the vehicle 3 (see FIG. 10).

Note that any kind of power storage source may be covered by the battery cover 27 or positioned within the battery compartment 27a, such as one or more replaceable batteries, one or more fixed batteries, one or more capacitors, or a combination thereof.

Positioning the battery 28 (or any other power storage source) in this manner, that is protruding from the vehicles' side walls, may be advantageous since it allows charging and/or battery exchange stations 40 easy access to the battery 28 for charging or battery replacement. In particular, if a battery exchange scheme is used, in which case the protruding battery cover 27 covers a battery compartment or slot 27a (e.g. see FIG. 12), the protruding character of the battery cover 27 may provide advantageous guiding for the battery 28 during battery exchange operation. However, it is clear from the present description that the battery cover 27 is not in any way required to protrude from a side wall of the vehicle to provide a highly advantageous system for charging and replacing batteries. In alternative embodiments of the vehicle, the battery cover may also be spaced from a side wall of the vehicle. Further, by arranging the battery cover 27 and the battery 28 fully above the bin storage space 24, within the upper part 17b, the battery 28 may be placed deeper into the vehicle 3 without causing a significant reduction in the available storage space for the bin 106. In addition to enable the use of larger batteries 28, a deeper arrangement of the batteries compared to the prior art solutions where the batteries are arranged at the vehicles' side walls, increases the overall stability conditions for the vehicle 3. The term 'deeper" is herein defined relative to the outermost perimeter of the vehicle 3 in the X-Y directions, that is, in a lateral direction towards the vertical axis going through the vehicle's 3 centre of gravity.

Alternatively, or in addition, the protruding battery cover 27 may hold downward-looking sensors (not shown), which may be used to establish the position of the vehicle on the track system 108, e.g. the alignment of the vehicle vis-à-vis a grid cell 122, or to establish the position of the vehicle vis-à-vis other vehicles on the track system 108, e.g. when operating the vehicles as a train of vehicles, e.g. as is disclosed in the international patent publication WO 2017/037095 A1, the contents of which are incorporated herein by reference.

When the vehicle 3 is positioned above a grid cell 122, e.g. to access a container 106 in the storage column 105 located vertically below the grid cell 122, the battery cover 27 will in this particular embodiment extend over a neighbouring grid cell 122. In other words, even though the vehicle 3 has a contact area against the rail system 108 which does not extend beyond the horizontal extension of one grid cell 122, it has a vertical projection which occupies more than one grid cell 122.

Such a configuration would normally prevent a second vehicle 3 from travelling over the neighbouring grid cell 122, i.e. the grid cell into which the protruding battery cover 27 of the first vehicle 3 extends. This could be a problem since it could reduce the overall capacity of the automated storage and retrieval system 1.

Figure 12:
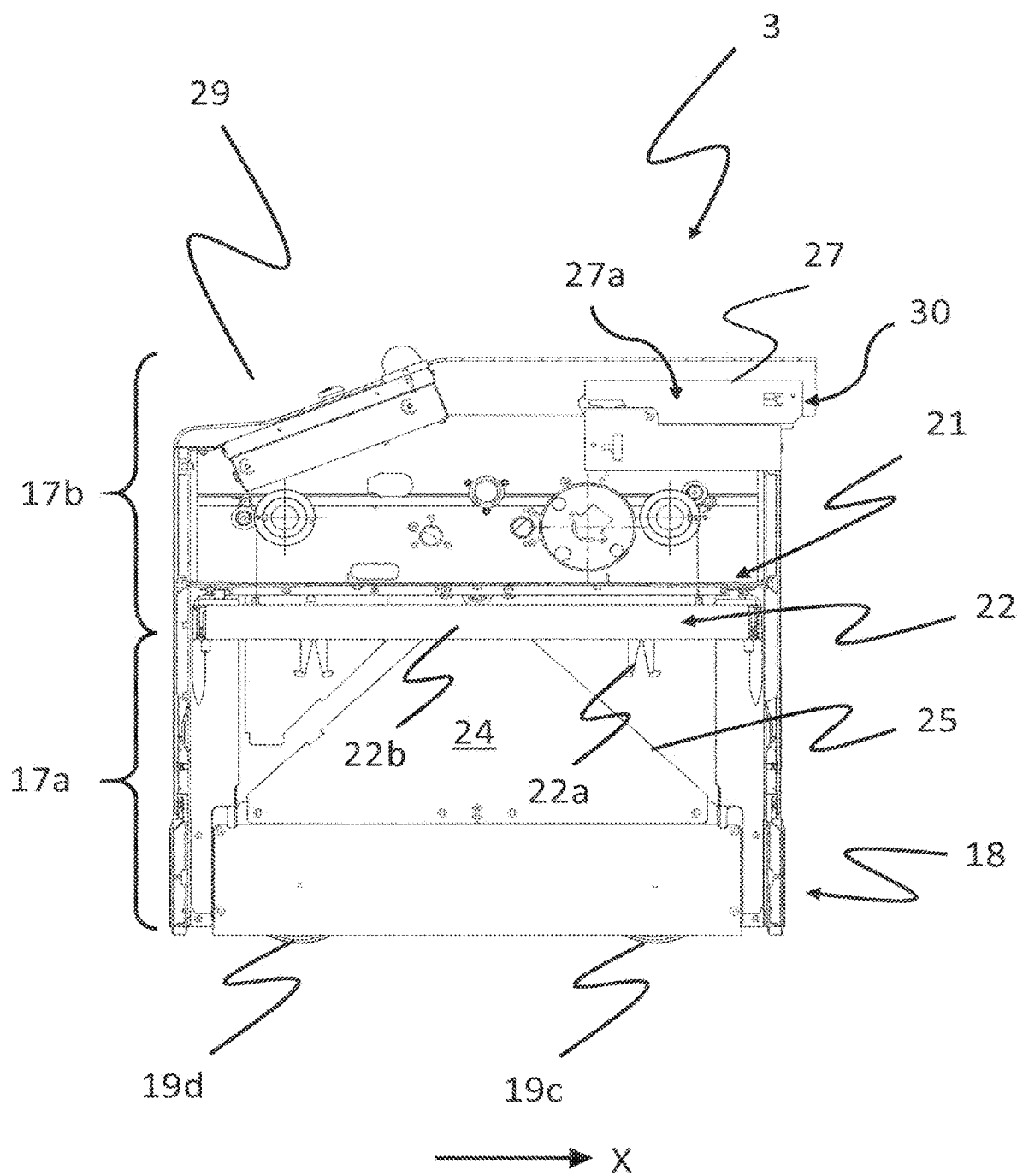
FIG. 12 is a cross-sectional side view of the container handling vehicle according to FIGS. 10 and 11.

In order to solve this particular problem, the container handling vehicle 3 comprises a recessed section 29 which is arranged in the upper part 17*b* opposite to the protruding battery cover 27 (see FIG. 12). In other words, the protruding battery cover 27 and the recessed section 29 are arranged at opposite sides of the container handling vehicle 3. The recessed section 29 is capable of accommodating the protruding battery cover 27 of other vehicles when they pass over a neighbouring grid cell 122. In particular, the recessed section 29 has a shape which is complementary to the shape of the protruding battery cover 27 and extends across the whole width of the container handling vehicle 3 in the Y direction, thus allowing vehicles 3 to pass each other over adjacent grid cells 122.

This is most clearly illustrated in FIGS. 7-9, which show a first vehicle 3*a* moving in to operate over a grid cell 122, while a second vehicle 3*b* is positioned over a neighbouring grid cell 122. When the vehicles 3*a*, 3*b* are oriented in the same direction, the protruding battery cover 27*a* of the first vehicle 3*a* is accommodated in the recessed section 29 of the second vehicle 3*b*, thereby allowing the vehicles 3*a*,3*b* to pass unhindered.

In the disclosed embodiment, the protruding battery cover 27 of each container handling vehicle 3 extends in the X direction and the recessed section 29 extends across the whole width of the vehicle 3 in the Y direction. However, it is understood that the protruding section may alternatively extend in the Y direction and the recessed section may extend across the whole width of the vehicle 3 in the X direction.

In yet another alternative configuration, the vehicle may comprise a protruding battery cover 27 as disclosed above, but where the complementary recessed section 29 is absent.

Figure 5:
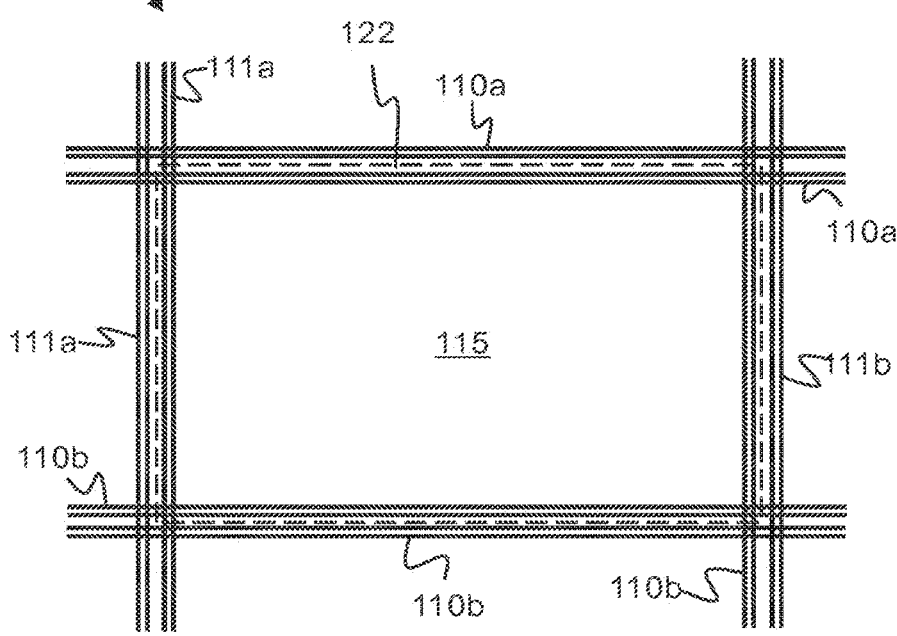
FIG. 5 is a top view of a prior art double rail grid.
Figure 6:
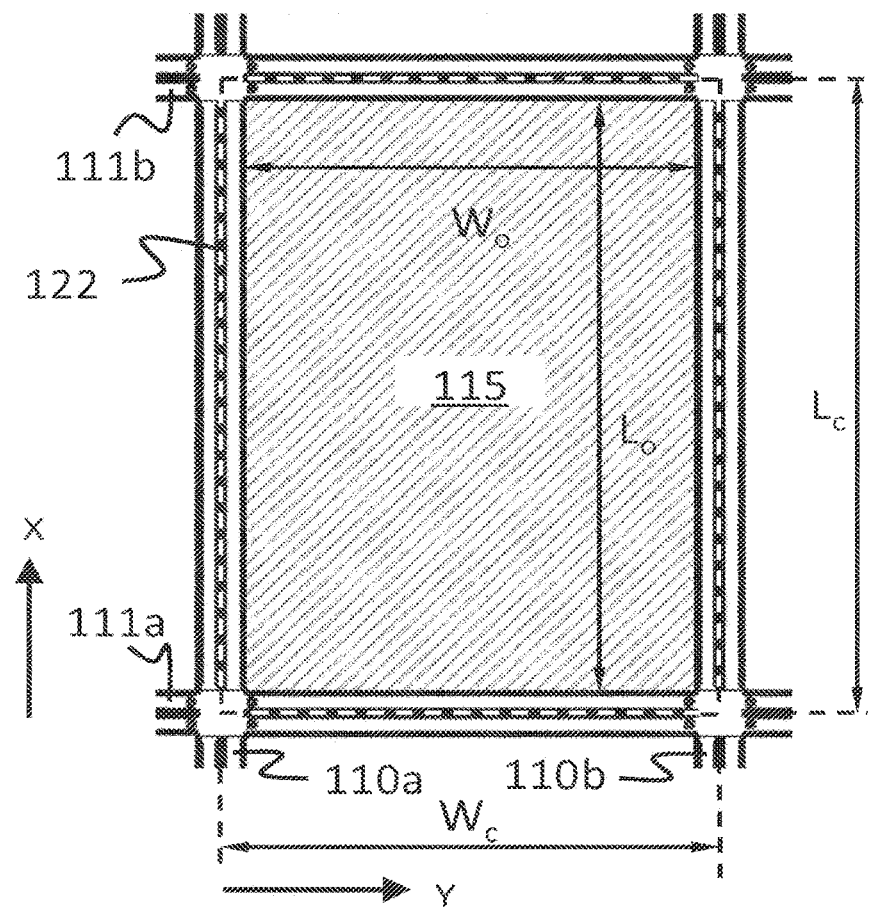
FIG. 6 is a top view of a track system of the automated storage and retrieval system according to FIG. 1.

In the track system 108 shown in FIGS. 5 and 8, each horizontal member making up the track system comprises two tracks. Consequently, each horizontal member is capable of accommodating two or more wheels in parallel. In such a track system 108, the borders between neighbouring grid cells 122 run along the centre-line of the horizontal members, as is indicated in FIG. 5.

The charging and/or battery exchange station 40 mentioned above will now be described in further details, and with particular reference to FIGS. 13-16.

Figure 13:
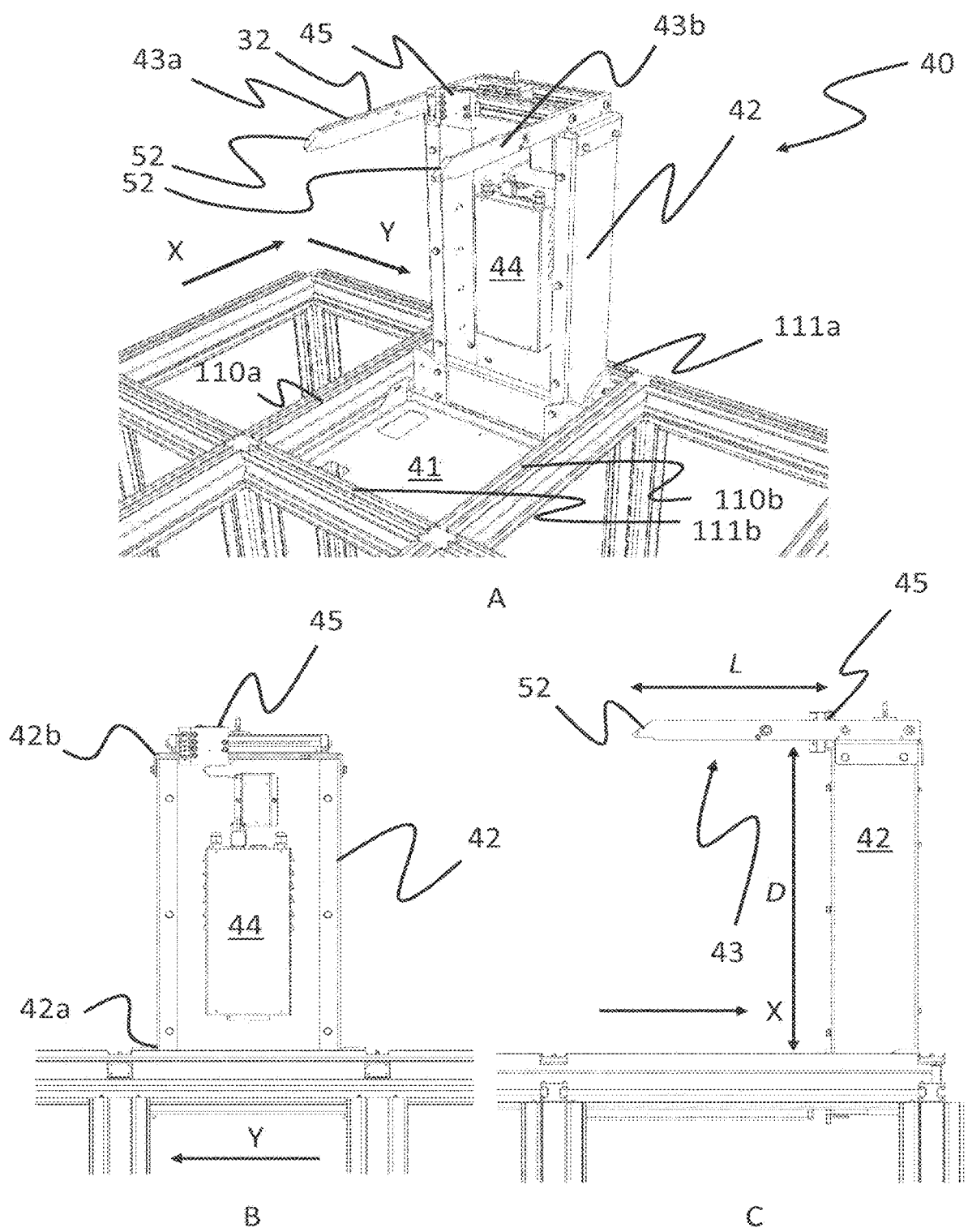
FIGS. 13A-C are views of an automated storage and retrieval system according to another embodiment of the invention, comprising a charging station installed on a storage grid, where

An example of a charging and/or battery exchange station 40, hereinafter referred to as a charging station, is shown in FIG. 13, both in a perspective view (FIG. 13A) and in side views along X direction (FIG. 13B) and along Y direction (FIG. 13C).

Figure 14:
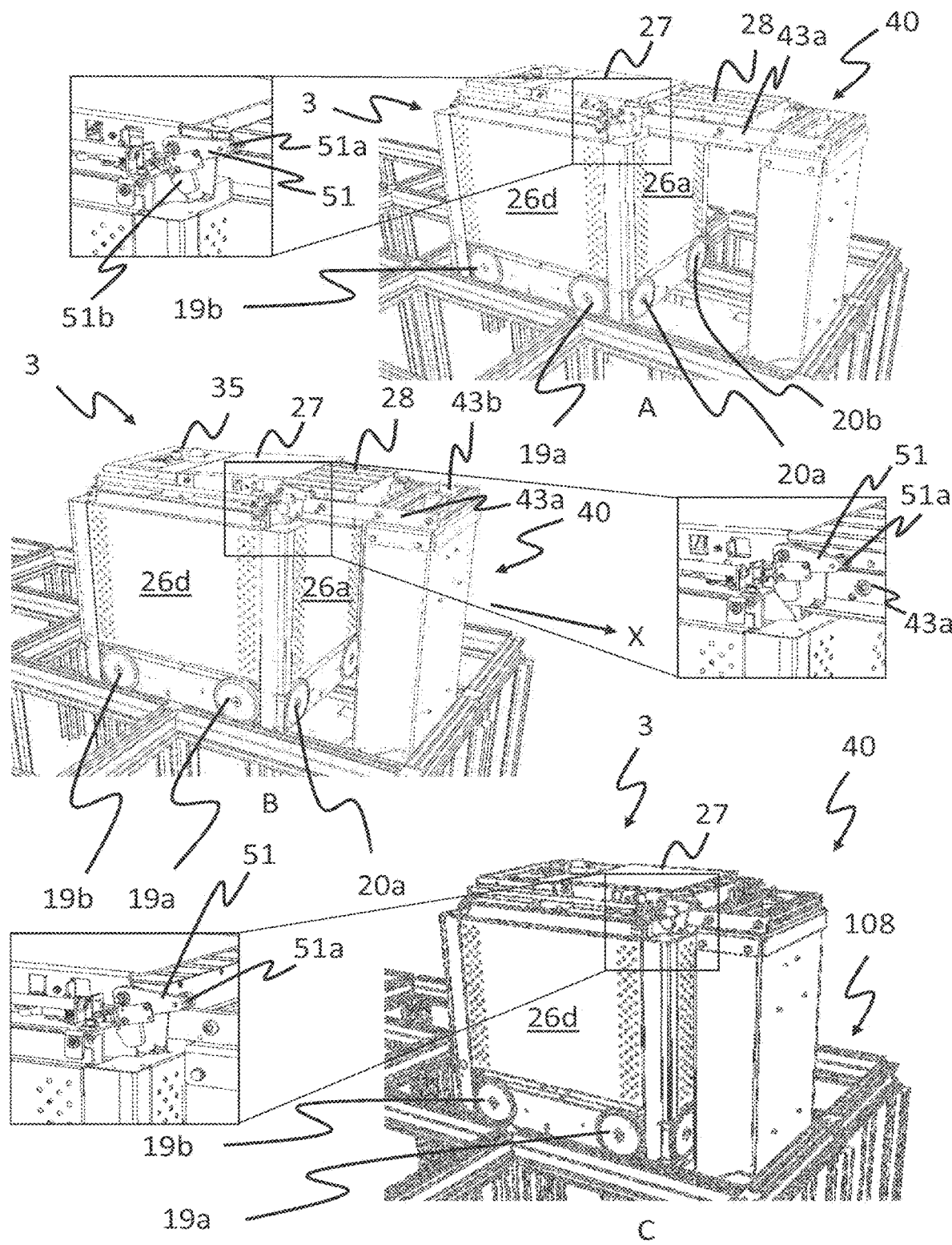
FIGS. 14A-F are perspective views of the automated storage and retrieval system according to FIG. 13 comprising the container handling vehicle according to FIGS. 7 to 9, where
Figure 14:
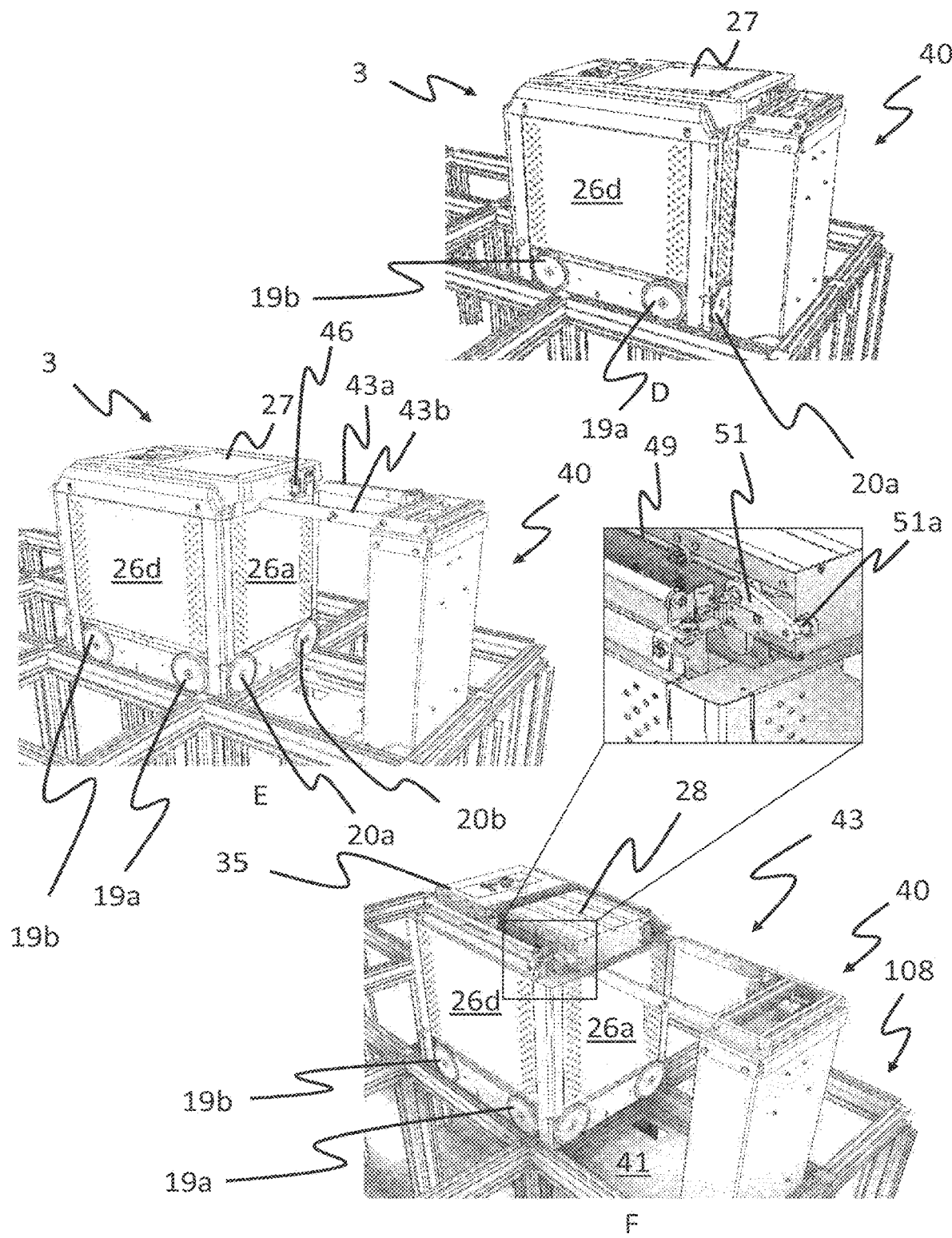

In the particular embodiment illustrated in FIGS. 13-14, the charging station 40 is mounted on a charging station base plate 41, which again is fixed (directly or indirectly) to neighbouring rails 110*a*, 110*b*, 111*a*, 111*b* of the track system 108 above a grid column 112 (see FIG. 8) at or near the perimeter of the framework structure 100. The particular grid column 112 containing the charging station 40 will hereinafter be referred to as a charging station cell.

The charging station 40 shown in FIG. 13-16 includes a vertical charging station column 42 fixed at a lower end 42*a* to the based plate 41. A charging socket 45 is arranged at or near an upper end 42*b* of the column 42, i.e. opposite to the lower end 42*a*, and electrically connected to a power supply 44, possibly via a power transformer transforming the charging power to the desired power level.

Figure 17:
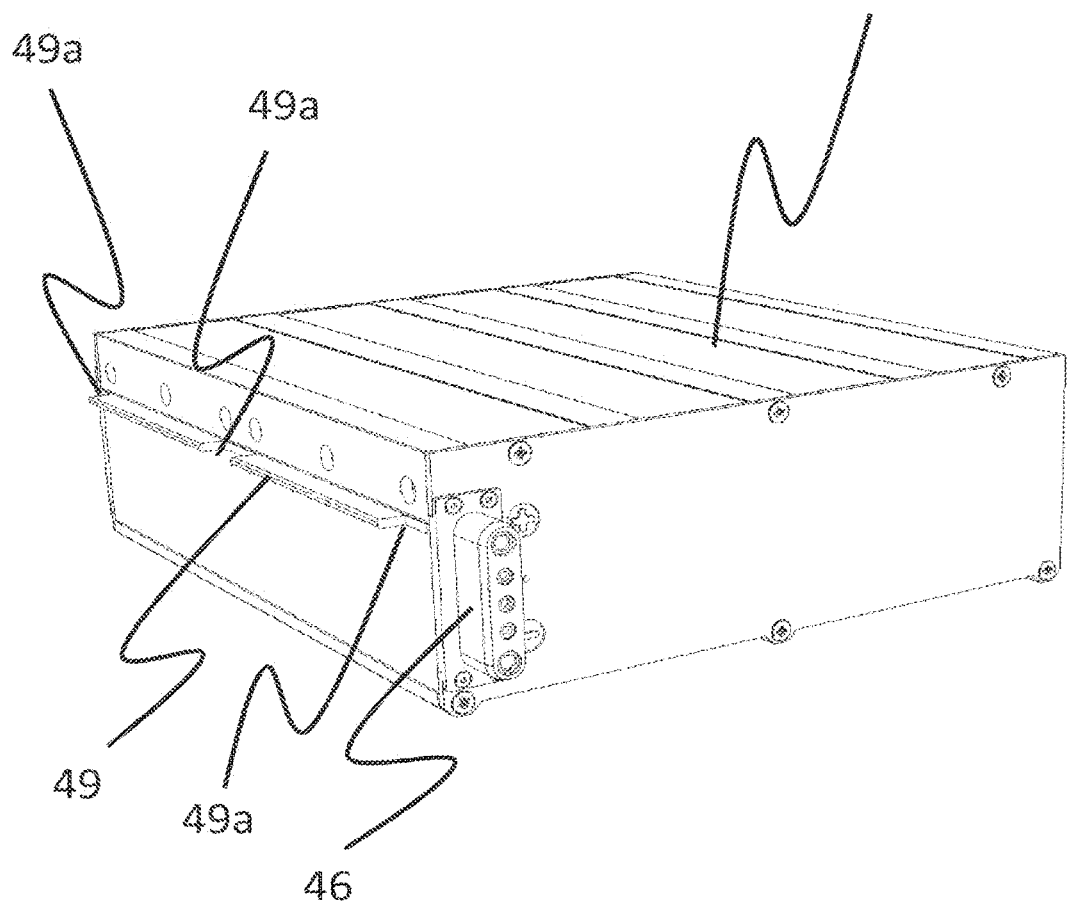
FIG. 17 is a perspective view of a chargeable power storage source.

The charging socket 45 is further configured to receive a charging plug 46 on the battery 28 installed on each vehicle 3 (see. FIG. 17), thereby allowing flow of electric power when the charging plug 46 is electrically coupled to the charging socket 45.

The charging socket 45 is resiliently attached to the charging station 42, such that the position of the charging socket 45 is fixed in an upper (unloaded) position when no external force act on the charging socket 45 and in a lower (loaded) position when the charging socket is exposed to the weight of the electrically connected battery 28. This feature ensures that the charging socket 45 and the charging plug 46 is at the same level relative to each other during connection and disconnection. Having the charging socket biased towards the upper position and able to move into a lower position due to the weight of the battery is a highly advantageous feature since it allows for the use of standard plug/socket charging connectors. Without the feature of having a biased charging socket, a plug and socket would have to be able to move vertically relative to each other while being fully connected (i.e. move relative to each other in a direction being perpendicular to the direction in which they move during connection). Although such plug/socket connectors may be envisioned, they would likely be unable to provide a secure connection having a required charging capacity and reliability.

The charging socket 45 and the charging plug 46 may of course be interchanged.

In general, any kind of disconnectable electrical connections between the charging station 40 and the battery 28 is possible.

An automated storage and retrieval system 1 as described herein may comprise a plurality of such charging stations 40, typically arranged along the perimeter of the track system 108. However, one or more charging stations 40 may alternatively or additionally be placed further into the track system 108 and/or fully outside. In the latter configuration, the charging station(s) 40 should be connected to the track system 108 by additional rails in order to allow the vehicles 3 to travel to their respective charging station 40.

One possible battery exchange process will now be described with particular reference to FIGS. 14A-F, FIGS. 15A-D and FIG. 16.

Figure 15A:
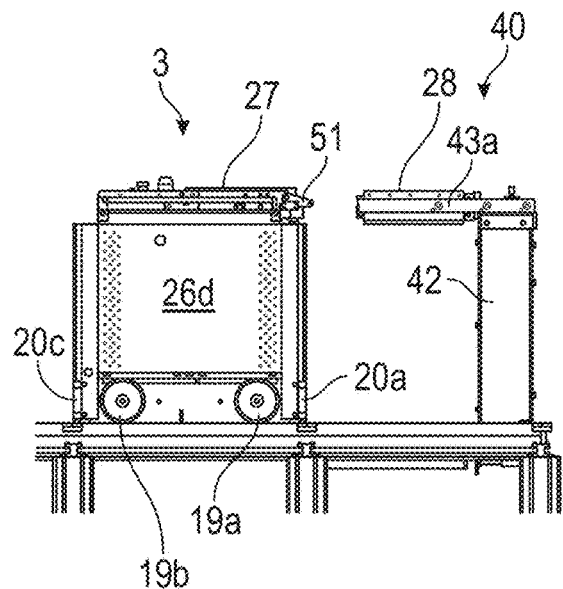
FIGS. 15A-D are side views of an exemplary automated storage and retrieval system showing one example of a sequence for inserting a charging station mounted power storage source into the power storage source compartment of the vehicle.
Figure 15B:
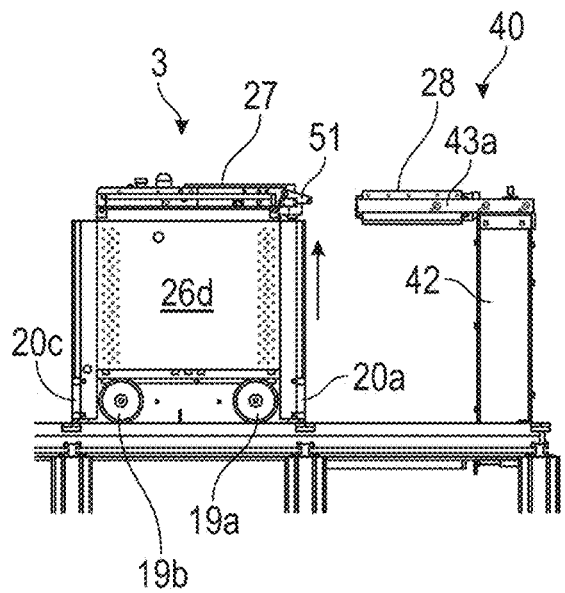
Figure 15C:
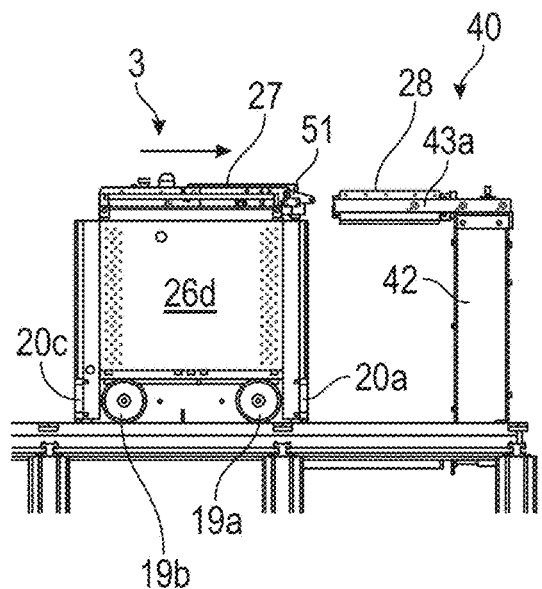
Figure 15D:
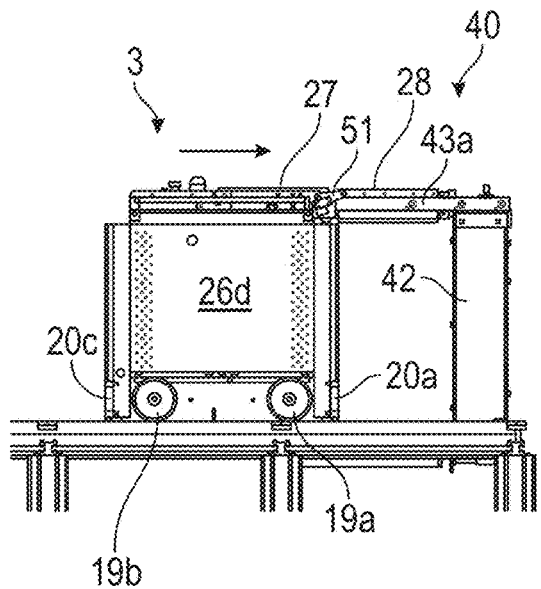

A vehicle 3, having transferred its discharged, or partly discharged, main battery 28 from its battery compartment 27*a* to a first charging station for charge, approaches a second charging station 40 containing a charged, or partly charged, main battery 28 (see FIG. 14A and FIG. 15C).

To allow the vehicle to enter the charging station storage cell, the first set of wheels 19*a-d* should contact the underlying track system 108 (see FIGS. 15A-D) and the second set of wheels 20*a-d* closest to the charging station 30 should be sufficiently high above the track system 108 in order not to interfere with the tracks 111 along the Y direction.

When the two wheels 20*a,b* of the second set of wheels 20*a-d* have entered the charging station storage cell, and prior to reaching the horizontal position where the charging station 40 is contacting the approaching vehicle 3, the vehicle 3 is again lowered towards the track system 108. The re-lowering is performed to allow correct alignments with the main battery 28 during the battery exchange process since weight of the battery 28 forces the charging socket 45 down to its lower (loaded) position as explained above. A lowering of the vehicle 3 also increases the overall stability of the exchange procedure. Typical vertical displacement of the vehicle 3 is 5-15 mm, for example 10 mm.

The charging station 40 should thus be configured such that the height of the main battery 28 under charge, relative to the track system 108, is approximately equal to the corresponding height of the battery compartment 27a on the vehicle 3 when the vehicle 3 is in a lowered position.

To allow movements of the vehicle 3 being void of a main battery 28, an auxiliary battery may be installed, for example in the same or similar way as disclosed in the patent publication WO 2015/104263 A1, the contents of which are incorporated herein by reference. Other solutions may also be envisaged, for example use of external power sources such as live rails, manual interference, etc.

Alternative embodiments in which either the charging station 40 or the vehicle 3 or a combination of both contain a plurality of batteries 28, thereby avoiding the need of vehicle movements between charging stations 40 during battery exchange. A multi-battery charging station applicable for the above-mentioned storage system 1 is disclosed in WO 2017/220627 A1, the contents of which are incorporated herein by reference.

The available charged battery 28 on the second charging station 40 is mounted onto a battery support 43, which in the example shown in FIGS. 13-15 is in form of two guiding pins 43a,43b (i.e. guiding arms) extending laterally into the track system 108 from each side of the charging station column's 42 upper end 42b.

When the vehicle 3 is contacting the charging station 40 (see FIG. 14A and FIG. 15D), a release mechanism 50 (i.e. a releasable locking mechanism) is activated, allowing the battery cover 27 to be tilted around a rotational Y axis.

Figure 16:
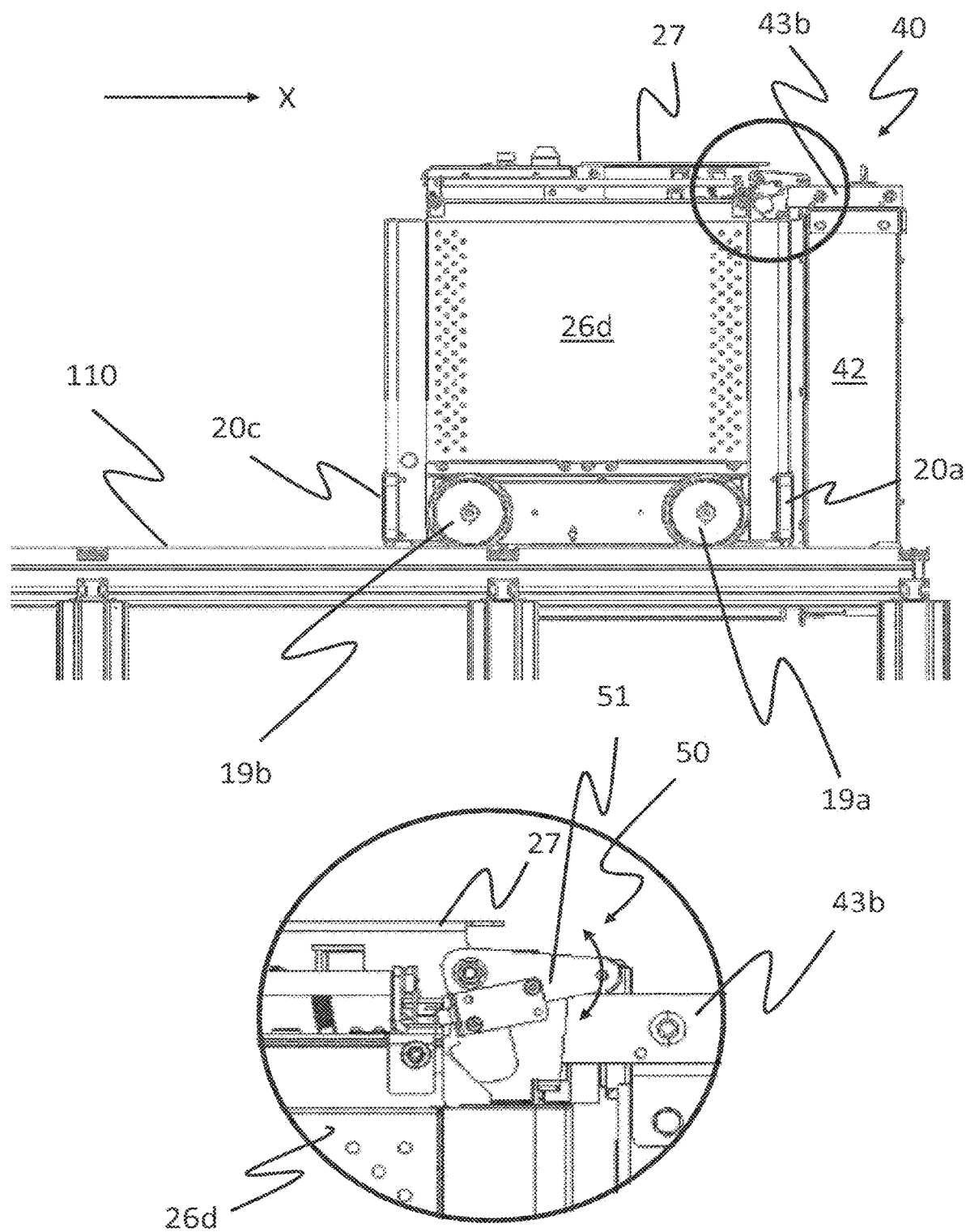
FIG. 16 is a side view of a container handling vehicle releasably connected to a charging station in accordance with one embodiment of the invention.

In the example shown in FIGS. 14-16, the release mechanism 50 comprises a pivot arm 51 arranged at each side of the opening of the battery compartment 27a into which the battery 28 should enter.

Further, each of the protruding ends of the guiding pins 43a,43b (constituting the battery support 43) displays a tapered section 52 (see FIGS. 13A and C). Upon contact between the pivot arm 51 and the guiding pins 43, a pivot arm contact element 51a of each pivot arm 51 is pushed towards the tapered section 52, thereby enforcing an upward directed pivoting movement of the pivot arm 51 (see FIG. 14A, FIG. 15D and FIG. 16). This pivot movements releases a security lock 51b (see FIGS. 14 and 18) allowing the above-mentioned tilt of the battery cover 27.

The operation of the release mechanism 50 is illustrated in each of the sequence drawings in FIG. 14 and in FIG. 16. To increase clarity, enlarged area drawings of the release mechanism 50 is added in FIGS. 14A-C and FIG. 14F. The enlarged area drawings clearly show the activation of the pivot arm movement upon contact with the tapered section 52 moving the security lock 51b away from the battery cover 27 and the subsequent entry of the battery 28.

When the guiding pins 43 with the attached battery 28 has entered a certain distance into the battery compartment 27a (see FIGS. 14B and C), the guiding pins 43 releases a battery lock 27b, 27c that allows further entry until the battery 28 is fully in its end position within the battery compartment 27a.

Figure 18:
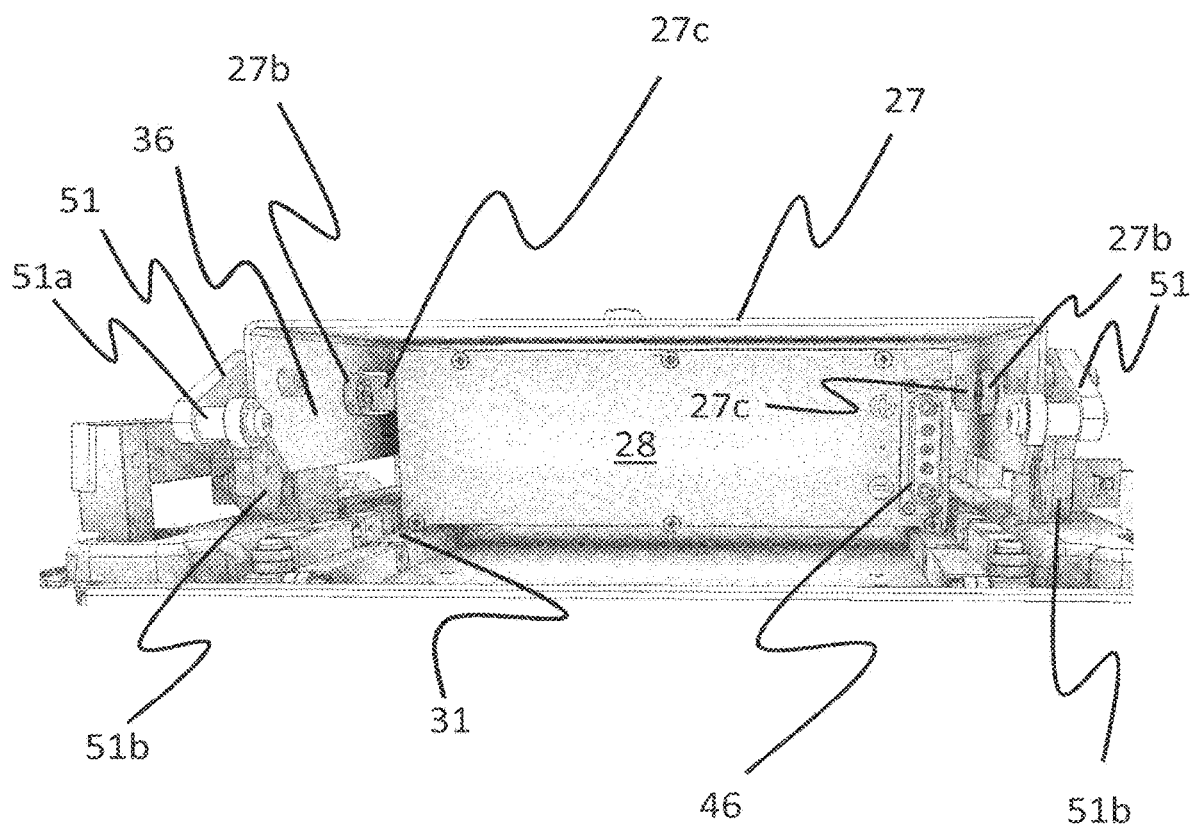
FIG. 18 is a cross sectional view along the X direction of the chargeable power storage source of FIG. 17 arranged in operative position within a battery compartment of a container handling vehicle.

In FIG. 18, the battery lock 27b,c (i.e. a power supply locking assembly) comprises a battery lock activator in the form of a wheel 27b and one or more blocking teeth 27c extending from the inner walls of the battery cover 27 (i.e. from the sidewalls 36 of the power supply locking assembly) and into the battery compartment 27a. When the tapered ends 52 of the guiding pins 43a,b contacts the wheel 27b, the battery cover 27 is tilted upwards, thereby displacing the one or more teeth 27c such that the battery 28 and the guiding pins 43a,b may continue the movement deeper into the battery compartment 27a. It is noted that the main function of the battery cover 27 is to act as a constructional element of the battery lock, providing rigidity to the two side walls on which the blocking teeth and the wheel is arranged. Thus, in other embodiments the battery cover may be any element able to provide adequate support/rigidity to the two side walls (or longitudinal elements) on which the blocking teeth and the wheel is arranged.

In this end position, and before retraction of the vehicle 3, the battery 28 can be electrically connected two both the charging station 40 and i.e. the drive motors for the wheels 19a-d,20a-d.

When the battery 28 is in its end position inside the battery cover 27 and in electrical contact with the corresponding electrical connector of the vehicle 3, the battery cover 27 tilts back to its initial position such that the teeth 27c physically locks or holds the battery 28 within the battery compartment 27a. As an example, the teeth 27c may enter dedicated recesses 49a within support rails 49 arranged at both sides of the battery 28 (see FIG. 17).

The battery lock 27b,c may be any physical hindrance within the battery compartment 27a. As an alternative to the above-mentioned teeth 27c, the battery lock may comprise one or more protruding wedges that the battery 28 may surpass in one direction, but not in the other. In this configuration, the wedge shape would act as the battery lock activator 27b.

When the battery 28 is in its end position and successfully locked into the battery compartment 27a by the battery lock 27b,c, the second set of wheels 20a-d of the vehicle 3 is lifted from the track system 108 (typically between 5-15 mm), thereby lifting the overall height of the vehicle 3. This operation causes the battery 28 to be released from the battery support 43, for example from dedicated pockets or tracks within the first and second guiding pins 43a,b (see FIG. 13A).

Since now the battery lock 27b,c is locking the battery 28 into the battery compartment 27a, and the battery 28 has been lifted free from the battery support 43, a retraction of the vehicle 3 out of the charging station storage cell leaves the battery 28 electrically connected to the vehicle 3.

In addition to allowing successful exchange of battery, the blocking of the battery 28 into the battery compartment 27a has the advantage that the battery 28 cannot be unintentionally displaced within the battery cover 27 during operation.

When the control system has sent an instruction to the vehicle 3 to place its battery 28 into a charging station 40 for charge, the steps for transferring the battery 28 from the vehicle 3 to the charging station 40 are essentially equal or similar to the opposite sequence and direction of the above-mentioned steps of transferring the battery 28 from the charging station 40 to the vehicle 3.

Hence, the vehicle 3 is first raised to both allow the vehicle to enter the charging station storage cell without interference of the second set of wheels 20 with the tracks 111 in the second direction (Y) and to align the operative battery 28 with the charging socket 45 of the charging station 40. As mentioned above, the charging socket 45 is in the exemplary configuration of FIGS. 13-16 in an upper, unloaded position.

During the approach of the vehicle 3 towards the charging station 40, the wedged ends 52 of the first and second guiding pins 43a,b first activate the tilt of the battery house 27 via the release mechanism 51, then active the battery lock 27b,c causing the battery cover 27 to tilt upwards, thereby removing the blocking teeth 27c from the corresponding recesses 49a in the support rail 49.

By lowering the vehicle 3 towards the track system 108, the support rails 49 of the battery 28 mesh with the battery support 43. A subsequent retraction of the vehicle 3 would thus leave the battery 28 in the desired charging position on the charging station 40.

To allow larger batteries within the vehicle 3, both the battery cover 27 and the optional release mechanism 50 may be arranged so that they protrude horizontally in the X direction beyond the otherwise generally vertical side walls 26c and 26d. In this way, the overall capacity of each vehicle 3 in the system 1 may be increased significantly without necessitating making the tracks 110,111 wider.

In case there is a need of manual interference for removing the battery 28 from the battery compartment 27a, for example due to general maintenance or accidental battery jamming, a configuration with a protruding release mechanism 50 has an additional advantage in that it allows easy manual unlocking of the battery 28. That is, the protruding arrangement allows for exertion of sufficient manual force on the release mechanism 50, an operation that would be difficult if for example the release mechanism 50 was arranged deep within the battery cover 27.

The protruding configuration described above is also beneficial for ensuring early engagement in the charging station 40.

An example of a battery 28 is shown in perspective in FIG. 17. One of two support rails 49 is shown protruding from a side wall of the battery 28. And identical support rail is protruding from the opposite side wall. The purpose of the support rails 49 is to both ensure a stable support of the battery 28 on the battery support/guiding pins 43 and to ensure an accurate guiding of the battery 28 into and out of the battery compartment 27a during exchange. FIG. 18 shows the battery 28 with support rails 49 being inserted fully within the battery compartment 27a. In the particular configuration shown in FIG. 18, the battery 28 is approximately half the maximum allowable volume of a battery.

Figure 19:
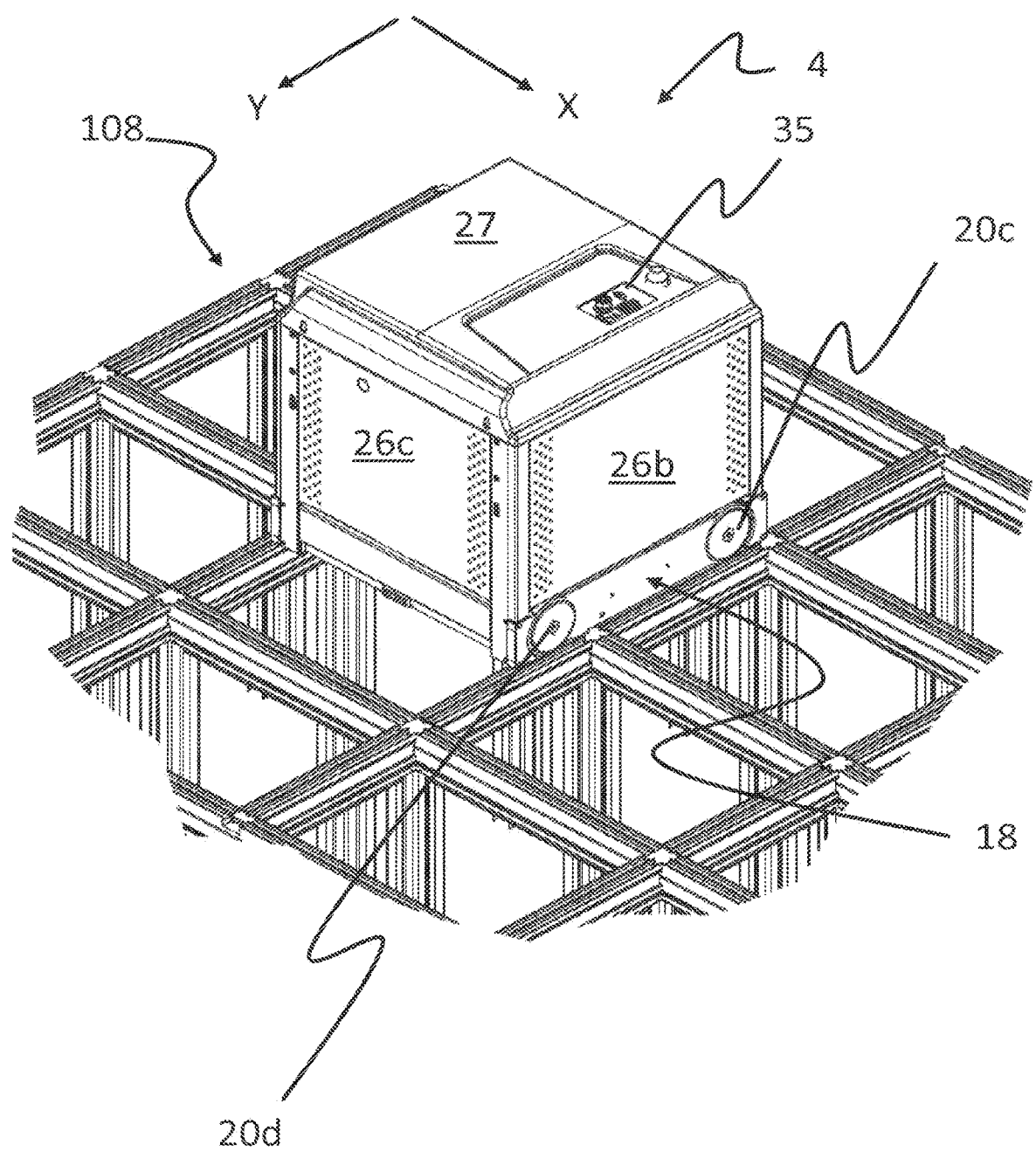
FIG. 19 is a perspective view of a container handling vehicle according to a second embodiment of the invention.
Figure 20:
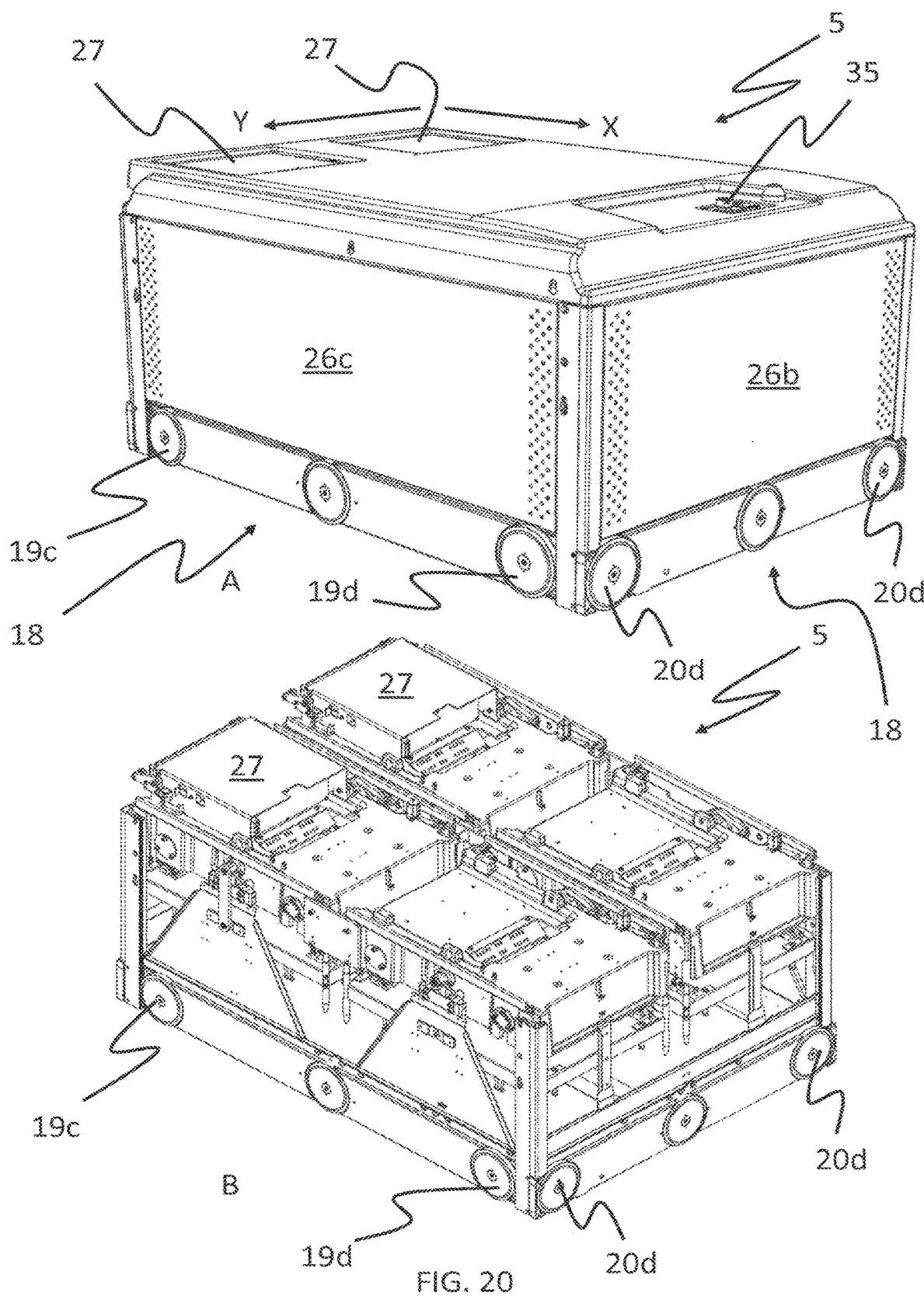
FIGS. 20A and B are perspective side views of a container handling vehicle of a third embodiment of the invention.

FIGS. 19 and 20 show perspective views of a vehicle 4,5 on a framework structure 100 according a second and third embodiments, respectively. As for the vehicle 3 according to the first embodiment, the battery supply cover(s) 27 enclosing the battery compartment(s) 27a is for the second and third embodiments arranged above the bin storage space 24.

FIGS. 20A and B shows an example of a vehicle 5 comprising two battery covers 27 arranged adjacent to another. In FIG. 20B the outer walls and lid of the vehicle 5 have been removed. Any exchange of batteries 28 may for this exemplary vehicle 5 use two charging station 40, either one at the time, or simultaneously. In order to inter alia improve weight distribution during lifting and transport, the vehicle 5 comprises six wheels for each wheel set.

Figure 21:
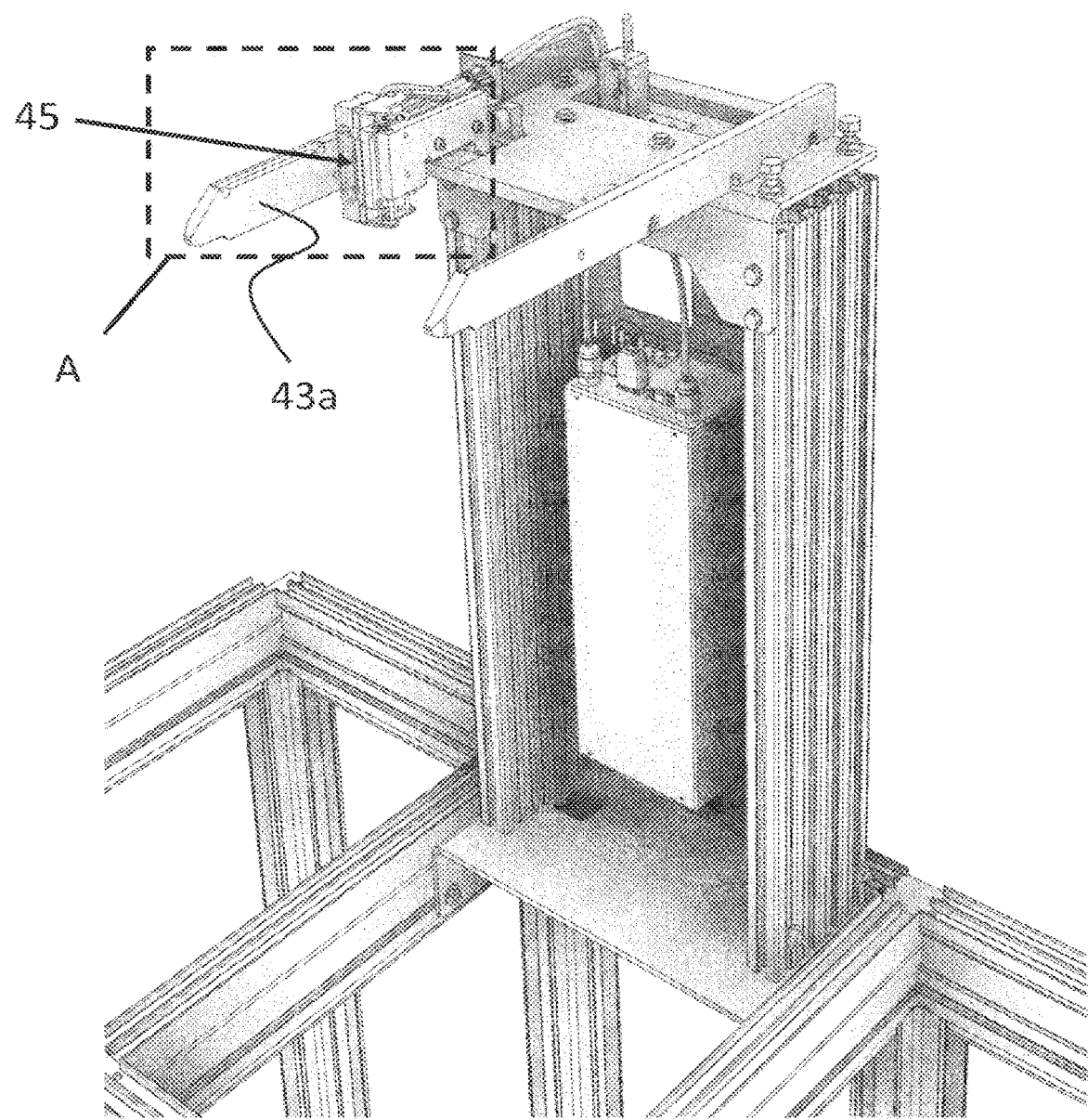
FIG. 21 is a perspective view of an embodiment of a charging station according to the invention.

FIGS. 21 and 22 show a second embodiment of a charging station for use with the automated storage and retrieval system. In this embodiment, the protrusion 32 on the guiding pins 43a,43b are more extended in the lateral direction. As discussed above, the charging socket 45 is displaceable in a vertical direction, relative the guiding pins 43a,43b (or alternatively relative the charging station column 42), between an upper position and a lower position. In FIGS. 21 and 22, the charging socket is shown in the upper position.

The charging socket 45 is biased towards the upper position by a spring 33. In this particular embodiment, the biasing is obtained by having the charging socket 45 slidably connected via a bracket 34a to a column connecting element 34b, and by having the spring arranged between the bracket 34a and the column connecting element 34b, such that the bracket 34a is biased into the upper position.

In the preceding description, various aspects of a charging station and an automated storage and retrieval system according to the invention have been described with reference to the illustrative embodiment. However, this description is not intended to be construed in a limiting sense. Various modifications and variations of the illustrative embodiment, as well as other embodiments of the system, which are apparent to persons skilled in the art, are deemed to lie within the scope of the present invention as defined by the following claims.

The following paragraphs are intended to demonstrate that certain features may be included together with other features in one or more embodiments of the disclosed invention. These are merely meant to be explicit examples of combinations of features and not an exhaustive list.

In one or more embodiments, an automated storage and retrieval system (1) comprises a track system (108) comprising a first set of parallel tracks (110) arranged in a horizontal plane (P) and extending in a first direction (X), and a second set of parallel tracks (111) arranged in the horizontal plane (P) and extending in a second direction (Y) which is orthogonal to the first direction (X), said first and second sets of tracks (110, 110) forming a grid pattern in the horizontal plane (P) comprising a plurality of adjacent grid cells (122), each grid cell comprising a grid opening (115) defined by a pair of adjacent tracks (110a, 110b) of the first set of tracks (110) and a pair of adjacent tracks (111a, 111b) of the second set of tracks (111); a plurality of storage columns (105) located beneath the track system (108), wherein each storage column (105) is located vertically below a grid opening (115) and arranged to store a stack (107) of storage containers (106); a container handling vehicle (3-5) for lifting at least one storage container (106) stacked in the stacks (107), the container handling vehicle (3-5) being configured to move laterally on the track system (108) above the storage columns (105) to access the storage containers (106) via the grid openings (115), wherein the container handling vehicle (3-5) comprises a lower part (17a) comprising at least one storage compartment (24) for storing a storage container (106), an upper part (17b) arranged vertically above the lower part (17a), a wheel assembly (18) for guiding the container handling vehicle (3-5) along the track system (108) and a power supply compartment (27a) for accommodating a replaceable power supply (28); a replaceable power supply (28) for accommodation in the power supply compartment, having a power supply charging connection (46); and a charging station (40) for charging of the replaceable power supply (28), the charging station (40) comprising a charging connection (45) configured to create an electrical connection with the power supply charging connection (46) and a power supply support (43) for releasably supporting the power supply (28) during charging; wherein the power supply compartment (27a) is arranged in the upper part (17b) of the container handling vehicle (3-5) and is configured to receive the replaceable power supply (28) via an opening facing towards the first direction (X) or the second direction (Y).

In the system according to any embodiment, the power supply support (43) may be arranged to extend into the power supply compartment (27a) to retrieve a discharged power supply (28) or insert a charged power supply (28). In the system according to any embodiment, the power supply compartment (27a) may comprise a power supply locking assembly (27, 27b, 27c) arranged to hold the power supply (28) in place within the power supply compartment (27a). In the system according to any embodiment, the power supply locking assembly (27,27b,27c) may be moveable between a first position, in which the power supply locking assembly may hold the power supply in place, and a second position, wherein the power supply may be moved. In the system according to any embodiment, the power supply locking assembly (27, 27b, 27c) may be locked in the first position by a releasable locking mechanism (50). In the system according to any embodiment, the power supply support (43) may be arranged to interact with the releasable locking mechanism (50) and/or the power supply locking assembly (27,27b,27c), such that the power supply locking assembly may move into the second position when the power supply support (43) is extended into the power supply compartment (27a) to retrieve a discharged power supply or insert a charged power supply. In the system according to any embodiment, the power supply locking assembly may be pivotably connected to the upper part (17b) of the container handling vehicle (3-5), such that the power supply locking assembly may pivot between the first and second position.

In the system according to any embodiment, the power supply support (43) may comprise two laterally extending guide arms (43a,43b) between which the replaceable power supply (28) may be supported. In the system according to any embodiment, at least one of the guide arms (43a,43b) may comprise an end (52) for interaction with the releasable locking mechanism (50) and/or the power supply locking assembly. In the system according to any embodiment, the replaceable power supply (28) may comprise a support rib (49) arranged on each of two opposite sides of the power supply, each support rib (49) arranged to interact with a corresponding guide arm (43a,43b) of the power supply support. In the system according to any embodiment, each support rib (49) may comprise a recess (49a) or protrusion for interaction with a corresponding protrusion (32) or recess, respectively, arranged on the guide arms (43a,43b). In the system according to any embodiment, the interacting recesses (49a) and protrusions (32) may be arranged such that the power supply (28) is prevented from lateral movement when supported by the power supply support. In the system according to any embodiment, the power supply locking assembly (27, 27b, 27c) may comprise locking elements (27c), the locking elements arranged to interact with the power supply (28), optionally via support ribs (49) arranged on each of two opposite sides of the power supply, when the power supply is arranged in the power supply compartment and the power supply locking assembly (27, 27b, 27c) is in the first position, such that the power supply is prevented from moving in at least a lateral direction.

In the system according to any embodiment, the wheel assembly (18) may comprise a first set of wheels (19), arranged to engage with the first set of tracks (110), and a second set of wheels (20), arranged to engage with the second set of tracks (111), the first set of wheels (19) is moveable between an upper and a lower wheel position, such that the first set of wheels (19) engage with the first set of tracks (110) in the lower wheel position and the second set of wheels (20) engage with the second set of tracks (111) in the upper wheel position. In the system according to any embodiment, the power supply locking assembly (27, 27b, 27c) may be arranged to be in the first position when the power supply support (43) extends into the power supply compartment and the first set of wheels (19) is in the lower wheel position. In the system according to any embodiment, the power supply locking assembly (27, 27b, 27c) may be arranged to be in the second position when the power supply support (43) extends into the power supply compartment and the first set of wheels (19) is in the upper wheel position. In the system according to any embodiment, the power supply (28) may be arranged to be supported by the power supply support (43), when the power supply support (43) extends into the power supply compartment (27a) and the first set of wheels (19) is in the upper wheel position. In the system according to any embodiment, the power supply (28) may be arranged to be separate from the power supply support (43) and supported by at least one support surface (31) arranged inside the power supply compartment, when the power supply support (43) extends into the power supply compartment and the first set of wheels (19) is in the lower wheel position. In the system according to any embodiment, the power supply support (43) may be arranged at a fixed level relative the track system (108), and the charging connection (45) is movable between a lower connection position and an upper connection position relative the track system (108); in the lower connection position, the charging connection (45) is arranged at a level corresponding to the level of the power supply charging connection (46) when the power supply (28) is supported by the power supply support (43); and in the upper connection position, the charging connection (45) is arranged at a level corresponding to the level of the power supply charging connection (46) when the power supply (28) is accommodated in the power supply compartment and the first set of wheels (19) is in the lower wheel position. In the system according to any embodiment, the charging connection (45) may be biased towards the upper connection position.

In one or more embodiments, a charging station (40) for a replaceable power supply (28) comprises a power supply charging connection (46), wherein the charging station (40) comprises a charging connection (45) configured to create an electrical connection with the power supply charging connection (46) and a power supply support (43) for releasably supporting the power supply (28) during charging, wherein the charging connection (45) may move between a lower connection position and an upper connection position relative the power supply support (43); and in the lower connection position, the charging connection (45) is arranged at a level corresponding to the level of the power supply charging connection (46) when the power supply (28) is supported by the power supply support (43); and the charging connection (45) is biased towards the upper connection position, such that the charging connection is in the upper connection position when the power supply support is not supporting a power supply.

In the charging station according to any embodiment, the power supply support (43) may comprise two laterally extending guide arms (43a,43b) by which the replaceable power supply (28) may be supported, at least one guide arm comprises a wedge-shaped end (52) extending beyond a section of the guide arms by which the power supply may be supported. In the charging station according to any embodiment, the section of each guide arm may comprise at least one recess or protrusion (32) for interaction with the power supply, such that lateral movement of a supported power supply is prevented.

In one or more embodiments, a container handling vehicle for an automated storage system according to any above-described embodiment may feature a lower part (17a) comprising at least one storage compartment (24) for storing a storage container (106), an upper part (17b) arranged vertically above the lower part (17a), a wheel assembly (18) for guiding the container handling vehicle (3-5) along a track system (108) and a power supply compartment (27a) for accommodating a replaceable power supply (28), wherein the wheel assembly (18) comprises a first set of wheels (19), arranged to engage with a first set of tracks (110) of the track system (108), and a second set of wheels (20), arranged to engage with a second set of tracks (111) of the wheel system (108), the first set of wheels (19) can be moved between an upper and a lower position, such that the first set of wheels (19) engage with the first set of tracks (110) in the lower position and the second set of wheels (20) engage with the second set of tracks (111) in the upper position, wherein the power supply compartment is arranged to receive the replaceable power supply (28) via an opening facing in the direction in which the vehicle may move when the first set of wheels (19) are in the lower position.

In the container handling vehicle according to any embodiment, the power supply compartment (27a) may comprise a power supply locking assembly (27, 27b, 27c) arranged to hold the power supply (28) in place within the power supply compartment (27a), the power supply locking assembly (27,27b,27c) is pivotably connected to the upper part (17b) of the container handling vehicle (3-5), such that the power supply locking assembly may pivot between a first position, in which the power supply locking assembly may hold the power supply in place, and a second position, wherein the power supply may be moved. In the container handling vehicle according to any embodiment, the power supply locking assembly (27, 27b, 27c) may be locked in the first position by a releasable locking mechanism (50).

In one or more embodiments, a method of charging a power supply (28) accommodated within a power supply compartment (27a) of a container handling vehicle (3-5) using a charging station (40) comprising a power supply support (43), the container handling vehicle (3-5) being configured to move on a track system (108) comprising a first set of parallel tracks (110) arranged in a horizontal plane (P) and extending in a first direction (X), and a second set of parallel tracks (111) arranged in the horizontal plane (P) and extending in a second direction (Y) which is orthogonal to the first direction (X), said first and second sets of tracks (110, 110) forming a grid pattern in the horizontal plane (P) comprising a plurality of adjacent grid cells (122), each grid cell comprising a grid opening (115) defined by a pair of adjacent tracks (110a, 110b) of the first set of tracks (110) and a pair of adjacent tracks (111a, 111b) of the second set of tracks (111); the method comprises the following steps: moving the container handling vehicle (3-5) to a position where the power supply support (43) of the charging station (40) is at least partly entering the power supply compartment (27a) containing the power supply (28) and where at least one charging connection (45) of the charging station (40) is set in electrical contact with at least one power supply charging connection (46) of the power supply (28), transferring the power supply (28) from the power supply compartment (27a) of the container handling vehicle (3-5) to the power supply support (43) and reversing the container handling vehicle (3-5), leaving the power supply (28) at charge on the charging station (40).

In the method according to any embodiment, the transfer of the power supply (28) from the power supply compartment (27a) of the container handling vehicle (3-5) to the power supply support (43) may be achieved by adjusting the height of the power supply compartment (27a) relative to the underlying track system (108). In the method according to any embodiment, during step a), the power supply compartment (27a) may be in an upper position relative to the track system (108). In the method according to any embodiment, the container handling vehicle (3-5) may comprise a lower part (17a) displaying at least one storage compartment (24) for storing a storage container (106) and an upper part (17b) arranged vertically above the lower part (17a), wherein the power supply compartment (27a) is located in the upper part (17b) of the container handling vehicle (3-5). In the method according to any embodiment, the automated storage and retrieval system (1) may be according to any of the above-described embodiments.

REFERENCE NUMERALS

1 Automated storage and retrieval system
3 Vehicle, first embodiment
3a First vehicle, first embodiment
3b Second vehicle, first embodiment
4 Vehicle, second embodiment
5 Vehicle, third embodiment
17 Vehicle body
17a Lower section of vehicle body 17
17b Upper section of vehicle body 17
18 Wheel assembly/rolling means/rolling device
19 First set of wheels
19a First wheel of the first set
19b Second wheel of the first set
19c Third wheel of the first set
19d Fourth wheel of the first set
20 Second set of wheels
20a First wheel of the second set
20b Second wheel of the second set
20c Third wheel of the second set
20d Fourth wheel of the second set
21 Lifting device
22 Gripping device
23 Lifting motor
24 Storage compartment, bin storage space
25 Side plate (attached to first or second set of wheels)
26 Side walls of vehicle
26a First side wall oriented in second direction (Y)
26b Second side wall oriented in second direction (Y)
26c Third side wall oriented in first direction (X)
26d Fourth side wall oriented in first direction (X)
27 Power supply cover/battery cover/battery house
27a Power supply compartment/battery compartment
27b Battery lock activator
27c Blocking teeth
28 Power supply/main power supply; battery/main battery
29 Recessed section
30 Opening of power supply compartment
31 Support surface within the power supply compartment
32 Protrusion on guiding pin
33 Spring
34a Bracket
34b Column connecting element
35 Onboard control and communication system
36 Sidewall/longitudinal element
40 Charging and/or battery exchange station/charging station
41 Charging station base plate/base plate
42 Charging station column/column
42a Lower end of charging station
42b Upper end of charging station
43 Power supply support/battery support/guiding means/guide/guiding pins 43a First guiding pin
43b Second guiding pin
44 Power supply/power transformer
45 Charging connection/charging plug
46 Power supply charging connection/charging socket
49 Support rail
49a Recess (in support rail 49)
50 Release mechanism
51 Pivot arm
51a Pivot arm contact element
52b Security lock (to hinder tilt of power supply cover 27)
52 Tapered section (of guiding pins)
100 Framework structure
102 Upright members of framework structure
103 Horizontal members of framework structure
104 Storage grid
105 Storage column
106 Storage container
106' Particular position of storage container
107 Stack
108 Rail system/track system
110 Parallel tracks in first direction (X)
110a First track of neighboring tracks 110
110b Second track of neighboring tracks 110
111 Parallel tracks in second direction (Y)
111a First track of neighboring tracks 111
111b Second track of neighboring tracks 111
112 Grid column
115 Grid opening
119 First port column/first port
120 Second port column/second port
122 Grid cell/storage cell
201 Prior art single cell storage container vehicle
201a Vehicle body of the storage container vehicle 101
201b Drive means/wheel arrangement, first direction (X)
201c Drive means/wheel arrangement, second direction (Y)
301 Prior art cantilever storage container vehicle
301a Vehicle body of the storage container vehicle 101
301b Drive means in first direction (X)
301c Drive means in second direction (Y)
X First direction
Y Second direction
Z Third direction
P Horizontal plane
D Distance from termination of charging station column's lower end to the lowermost part of the power supply support
L Distance from the outer perimeter of the charging station column to a geometrical size of the power supply and/or the horizontal center point of the vehicle under charge.

What is claimed is:

1. An automated storage and retrieval system comprising:
a track system comprising a first set of parallel tracks arranged in a horizontal plane and extending in a first direction, and a second set of parallel tracks arranged in the horizontal plane and extending in a second direction which is orthogonal to the first direction, said first and second sets of tracks forming a grid pattern in the horizontal plane comprising a plurality of adjacent grid cells, each grid cell comprising a grid opening defined by a pair of adjacent tracks of the first set of tracks and a pair of adjacent tracks of the second set of tracks;
a plurality of storage columns located beneath the track system, wherein each storage column is located vertically below a grid opening and arranged to store a stack of storage containers;
a container handling vehicle for lifting at least one storage container stacked in the stacks, the container handling vehicle being configured to move laterally on the track system above the storage columns to access the storage containers via the grid openings, wherein the container handling vehicle comprises a lower part comprising at least one storage compartment for storing a storage container, an upper part arranged vertically above the lower part, rolling means for guiding the container handling vehicle along the track system and a power supply compartment for accommodating a replaceable power supply;
a replaceable power supply for accommodation in the power supply compartment, having a power supply charging connection; and
a charging station for charging of the replaceable power supply, the charging station comprising a charging station charging connection configured to create an electrical connection with the power supply charging connection and a power supply support for releasably supporting the power supply during charging;
wherein the power supply compartment is arranged in the upper part of the container handling vehicle and is configured to receive the replaceable power supply via an opening facing towards the first direction or the second direction;
wherein the container handling vehicle comprises a second battery to allow movement of the container handling vehicle when void of the replaceable power supply.

2. The system according to claim 1, wherein the power supply support comprises two laterally extending guide arms between which the replaceable power supply may be supported.

3. The system according to claim 1, wherein the power supply support is arranged to extend into the power supply compartment to retrieve a discharged power supply or insert a charged power supply.

4. The system according to claim 1, wherein the replaceable power supply comprises a support rib arranged on each of two opposite sides of the power supply, each support rib arranged to interact with a corresponding guide arm of the power supply support.

5. The system according to claim 4, wherein each support rib comprises a recess or protrusion for interaction with a corresponding protrusion or recess, respectively, arranged on the corresponding guide arm, wherein the interacting recess and protrusion are arranged such that the power supply is prevented from lateral movement when supported by the power supply support.

6. The system according to claim 1, wherein the rolling means comprises a first set of wheels, arranged to engage with the first set of parallel tracks, and a second set of wheels, arranged to engage with the second set of parallel tracks, the first set of wheels is moveable between an upper wheel position and a lower wheel position, such that the first set of wheels engage with the first set of parallel tracks in the lower wheel position and the second set of wheels engage with the second set of parallel tracks in the upper wheel position.

7. The system according to claim 6, wherein the power supply is arranged to be supported by the power supply support, when the power supply support extends into the power supply compartment and the first set of wheels is in the upper wheel position.

8. The system according to claim 6, wherein the power supply is arranged to be separate from the power supply support and supported by at least one support surface arranged inside the power supply compartment, when the power supply support extends into the power supply compartment and the first set of wheels is in the lower wheel position.

9. The system according to claim 1, wherein the power supply compartment comprises a power supply locking assembly arranged to hold the power supply in place within the power supply compartment.

10. The system according to claim 9, wherein the power supply locking assembly is moveable between a first position, in which the power supply locking assembly may hold the power supply in place, and a second position, wherein the power supply may be moved.

11. The system according to claim 10, wherein the power supply locking assembly is pivotably connected to the upper part of the container handling vehicle, such that the power supply locking assembly may pivot between the first position and the second position.

12. The system according to claim 10, wherein the power supply locking assembly comprises locking elements, the locking elements arranged to interact with the power supply, optionally via support ribs arranged on each of two opposite sides of the power supply, when the power supply is arranged in the power supply compartment and the power supply locking assembly is in the first position, such that the power supply is prevented from moving in at least a lateral direction.

13. The system according to claim 10,
wherein the rolling means comprises a first set of wheels, arranged to engage with the first set of parallel tracks, and a second set of wheels, arranged to engage with the second set of parallel tracks, the first set of wheels is moveable between an upper wheel position and a lower wheel position, such that the first set of wheels engage with the first set of parallel tracks in the lower wheel position and the second set of wheels engage with the second set of parallel tracks in the upper wheel position, and
wherein the power supply locking assembly is arranged to be in the first position when the power supply support extends into the power supply compartment and the first set of wheels is in the lower wheel position.

14. The system according to claim 10, wherein the rolling means comprises a first set of wheels, arranged to engage with the first set of parallel tracks, and a second set of wheels, arranged to engage with the second set of parallel tracks, the first set of wheels is moveable between an upper wheel position and a lower wheel position, such that the first set of wheels engage with the first set of parallel tracks in the lower wheel position and the second set of wheels engage with the second set of parallel tracks in the upper wheel position, and
wherein the power supply locking assembly is arranged to be in the second position when the power supply support extends into the power supply compartment and the first set of wheels is in the upper wheel position.

15. The system according to claim 10, wherein the power supply locking assembly is locked in the first position by a releasable locking mechanism.

16. The system according to claim 15, wherein the power supply support is arranged to interact with the releasable locking mechanism and/or the power supply locking assembly, such that the power supply locking assembly may move into the second position when the power supply support is extended into the power supply compartment to retrieve a discharged power supply or insert a charged power supply.

17. The system according to claim 15, wherein at least one of guide arms of the power supply support comprises an end for interaction with the releasable locking mechanism and/or the power supply locking assembly.

18. A container handling vehicle for an automated storage and retrieval system, said automated storage and retrieval system comprising: a track system comprising a first set of parallel tracks arranged in a horizontal plane and extending in a first direction, and a second set of parallel tracks arranged in the horizontal plane and extending in a second direction which is orthogonal to the first direction, said first and second sets of tracks forming a grid pattern in the horizontal plane comprising a plurality of adjacent grid cells, each grid cell comprising a grid opening defined by a pair of adjacent tracks of the first set of tracks and a pair of adjacent tracks of the second set of tracks; a plurality of storage columns located beneath the track system, wherein each storage column is located vertically below a grid opening and arranged to store a stack of storage containers; and a charging station for charging of a replaceable power supply, the charging station comprising a charging station charging connection configured to create an electrical connection with a power supply charging connection of the replaceable power supply and a power supply support for releasably supporting the replaceable power supply during charging;
wherein the container handling vehicle is arranged for lifting at least one storage container stacked in the stacks, the container handling vehicle being configured to move laterally on the track system above the storage columns to access the storage containers via the grid openings;
wherein the container handling vehicle comprises a lower part comprising at least one storage compartment for storing a storage container, an upper part arranged vertically above the lower part, rolling means for guiding the container handling vehicle along the track system, and a power supply compartment for accommodating the replaceable power supply, wherein the power supply compartment is arranged in the upper part of the container handling vehicle and is configured to receive the replaceable power supply via an opening facing towards the first direction or the second direction; and
wherein the container handling vehicle comprises a second battery to allow movement of the container handling vehicle when void of the replaceable power supply.

* * * * *